United States Patent
Gendler et al.

(10) Patent No.: US 10,719,326 B2
(45) Date of Patent: Jul. 21, 2020

(54) COMMUNICATING VIA A MAILBOX INTERFACE OF A PROCESSOR

(71) Applicant: Intel Corporation, Santa Clara, CA (US)

(72) Inventors: Alexander Gendler, Kiriat Motzkin (IL); Larisa Novakovsky, Haifa (IL); Ariel Szapiro, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 291 days.

(21) Appl. No.: 15/886,313

(22) Filed: Feb. 1, 2018

(65) Prior Publication Data

US 2018/0181401 A1 Jun. 28, 2018

Related U.S. Application Data

(63) Continuation of application No. 14/609,835, filed on Jan. 30, 2015, now abandoned.

(51) Int. Cl.
*G06F 1/26* (2006.01)
*G06F 9/38* (2018.01)
(Continued)

(52) U.S. Cl.
CPC .............. *G06F 9/3802* (2013.01); *G06F 1/26* (2013.01); *G06F 1/324* (2013.01); *G06F 1/3206* (2013.01);
(Continued)

(58) Field of Classification Search
CPC ............... G06F 9/3881; G06F 9/30098; G06F 9/30123; G06F 9/30116; G06F 1/3206;
(Continued)

(56) References Cited

U.S. PATENT DOCUMENTS 5,163,153 A   11/1992  Cole et al.
5,210,828 A *  5/1993  Bolan ............... G06F 15/167
                                                    709/214
(Continued)

FOREIGN PATENT DOCUMENTS

EP            1 282 030 A1    5/2003

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

(Continued)

*Primary Examiner* — Jaweed A Abbaszadeh
*Assistant Examiner* — Brian J Corcoran
(74) *Attorney, Agent, or Firm* — Trop, Pruner & Hu, P.C.

(57) ABSTRACT

In one embodiment, a processor includes: a core to execute instructions, the core including a plurality of mailbox storages and a trust table to store a trust indicator for each of the plurality of mailbox storages; a first core perimeter logic coupled to the core and including a first storage to store state information of the core when the core is in a low power state; and a second core perimeter logic coupled to the first core perimeter logic and the core, the second core perimeter logic including a second storage to store the state information of the core when the first core perimeter logic is in a low power state. Other embodiments are described and claimed.

20 Claims, 19 Drawing Sheets

(51) Int. Cl.
  *G06F 1/3206* (2019.01)
  *G06F 1/3234* (2019.01)
  *G06F 1/3296* (2019.01)
  *G06F 1/324* (2019.01)

(52) U.S. Cl.
  CPC .......... *G06F 1/3243* (2013.01); *G06F 1/3296* (2013.01); *G06F 9/3881* (2013.01); *Y02D 10/126* (2018.01); *Y02D 10/152* (2018.01); *Y02D 10/172* (2018.01); *Y02D 50/20* (2018.01)

(58) Field of Classification Search
  CPC ........ G06F 1/3296; G06F 1/3243; G06F 1/26; G06F 21/51; G06F 21/79; G06F 21/78; Y02D 10/172
  See application file for complete search history.

(56) References Cited

U.S. PATENT DOCUMENTS

| | | |
|---|---|---|
| 5,522,087 A | 5/1996 | Hsiang |
| 5,590,341 A | 12/1996 | Matter |
| 5,621,250 A | 4/1997 | Kim |
| 5,931,950 A | 8/1999 | Hsu |
| 6,748,546 B1 | 6/2004 | Mirov et al. |
| 6,792,392 B1 | 9/2004 | Knight |
| 6,823,516 B1 | 11/2004 | Cooper |
| 6,829,713 B2 | 12/2004 | Cooper et al. |
| 6,996,728 B2 | 2/2006 | Singh |
| 7,010,708 B2 | 3/2006 | Ma |
| 7,043,649 B2 | 5/2006 | Terrell |
| 7,093,147 B2 | 8/2006 | Farkas et al. |
| 7,111,179 B1 | 9/2006 | Girson et al. |
| 7,194,643 B2 | 3/2007 | Gonzalez et al. |
| 7,272,730 B1 | 9/2007 | Acquaviva et al. |
| 7,412,615 B2 | 8/2008 | Yokota et al. |
| 7,434,073 B2 | 10/2008 | Magklis |
| 7,437,270 B2 | 10/2008 | Song et al. |
| 7,454,632 B2 | 11/2008 | Kardach et al. |
| 7,529,956 B2 | 5/2009 | Stufflebeam |
| 7,539,885 B2 | 5/2009 | Ma |
| 7,730,340 B2 | 6/2010 | Hu et al. |
| 2001/0044909 A1 | 11/2001 | Oh et al. |
| 2002/0156993 A1 | 10/2002 | Suzuoki |
| 2002/0194509 A1 | 12/2002 | Plante et al. |
| 2003/0061383 A1 | 3/2003 | Zilka |
| 2004/0064752 A1 | 4/2004 | Kazachinsky et al. |
| 2004/0098560 A1 | 5/2004 | Storvik et al. |
| 2004/0139356 A1 | 7/2004 | Ma |
| 2004/0177261 A1* | 9/2004 | Watt .................... G06F 12/1491 713/193 |
| 2004/0268166 A1 | 12/2004 | Farkas et al. |
| 2005/0022038 A1 | 1/2005 | Kaushik et al. |
| 2005/0033881 A1 | 2/2005 | Yao |
| 2005/0132238 A1 | 6/2005 | Nanja |
| 2006/0050670 A1 | 3/2006 | Hillyard et al. |
| 2006/0053326 A1 | 3/2006 | Naveh |
| 2006/0059286 A1 | 3/2006 | Bertone et al. |
| 2006/0069936 A1 | 3/2006 | Lint et al. |
| 2006/0117202 A1 | 6/2006 | Magklis et al. |
| 2006/0184287 A1 | 8/2006 | Belady et al. |
| 2006/0259828 A1 | 11/2006 | Swoboda |
| 2007/0005995 A1 | 1/2007 | Kardach et al. |
| 2007/0016817 A1 | 1/2007 | Albonesi et al. |
| 2007/0079294 A1 | 4/2007 | Knight |
| 2007/0106827 A1 | 5/2007 | Boatright et al. |
| 2007/0156992 A1 | 7/2007 | Jahagirdar |
| 2007/0214342 A1 | 9/2007 | Newburn |
| 2007/0239398 A1 | 10/2007 | Song et al. |
| 2007/0245163 A1 | 10/2007 | Lu et al. |
| 2007/0260838 A1* | 11/2007 | Schwemmlein ........ G06F 21/52 711/163 |
| 2008/0028240 A1 | 1/2008 | Arai et al. |
| 2008/0250260 A1 | 10/2008 | Tomita |
| 2008/0282345 A1* | 11/2008 | Beals ..................... G06F 21/51 726/21 |
| 2009/0006871 A1 | 1/2009 | Liu et al. |
| 2009/0150695 A1 | 6/2009 | Song et al. |
| 2009/0150696 A1 | 6/2009 | Song et al. |
| 2009/0158061 A1 | 6/2009 | Schmitz et al. |
| 2009/0158067 A1 | 6/2009 | Bodas et al. |
| 2009/0172375 A1 | 7/2009 | Rotem et al. |
| 2009/0172428 A1 | 7/2009 | Lee |
| 2009/0235105 A1 | 9/2009 | Branover et al. |
| 2010/0115309 A1 | 5/2010 | Carvalho et al. |
| 2010/0146513 A1 | 6/2010 | Song |
| 2010/0191997 A1 | 7/2010 | Dodeja et al. |
| 2011/0078463 A1 | 3/2011 | Fleming |
| 2011/0154090 A1 | 6/2011 | Dixon et al. |
| 2012/0079290 A1 | 3/2012 | Kumar |
| 2012/0246506 A1 | 9/2012 | Knight |
| 2013/0061064 A1 | 3/2013 | Ananthakrishnan et al. |
| 2013/0080803 A1 | 3/2013 | Ananthakrishnan et al. |
| 2013/0080804 A1 | 3/2013 | Ananthakrishnan et al. |
| 2013/0111120 A1 | 5/2013 | Ananthakrishnan et al. |
| 2013/0111121 A1 | 5/2013 | Ananthakrishnan et al. |
| 2013/0111226 A1 | 5/2013 | Ananthakrishnan et al. |
| 2013/0111236 A1 | 5/2013 | Ananthakrishnan et al. |
| 2013/0346774 A1 | 12/2013 | Bhandaru et al. |
| 2014/0006737 A1 | 1/2014 | Teh |
| 2014/0068290 A1 | 3/2014 | Bhandaru et al. |
| 2014/0129797 A1 | 5/2014 | Amdt |
| 2014/0195829 A1 | 7/2014 | Bhandaru et al. |
| 2014/0208141 A1 | 7/2014 | Bhandaru et al. |
| 2014/0344947 A1* | 11/2014 | Kalyanasundharam ..................... G06F 21/62 726/26 |
| 2015/0081980 A1 | 3/2015 | Walker |
| 2016/0224090 A1 | 8/2016 | Gendler |
| 2016/0321183 A1* | 11/2016 | Govindan ........... G06F 12/0862 |

OTHER PUBLICATIONS

SPEC-Power and Performance, Design Overview V1.10, Standard Performance Information Corp., Oct. 21, 2008, 6 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays In A GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scalling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling For Real-Time Embedded Systems," 2004, pp. 275-280.

Ravindra Jejurikar, et al., "Dynamic Slack Reclamation With Procrastination Scheduling In Real-Time Embedded Systems," 2005, pp. 13-17.

R. Todling, et al., "Some Strategies For Kalman Filtering and Smoothing," 1996, pp. 1-21.

R.E. Kalman, "A New Approach To Linear Filtering and Prediction Problems," 1960, pp. 1-12.

* cited by examiner

COMMUNICATING VIA A MAILBOX INTERFACE OF A PROCESSOR

This application is a continuation of U.S. patent application Ser. No. 14/609,835, filed Jan. 30, 2015, the content of which is hereby incorporated by reference.

TECHNICAL FIELD

Embodiments relate to power management of a system, and more particularly to power management of a multicore processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

DETAILED DESCRIPTION

Figure 1:
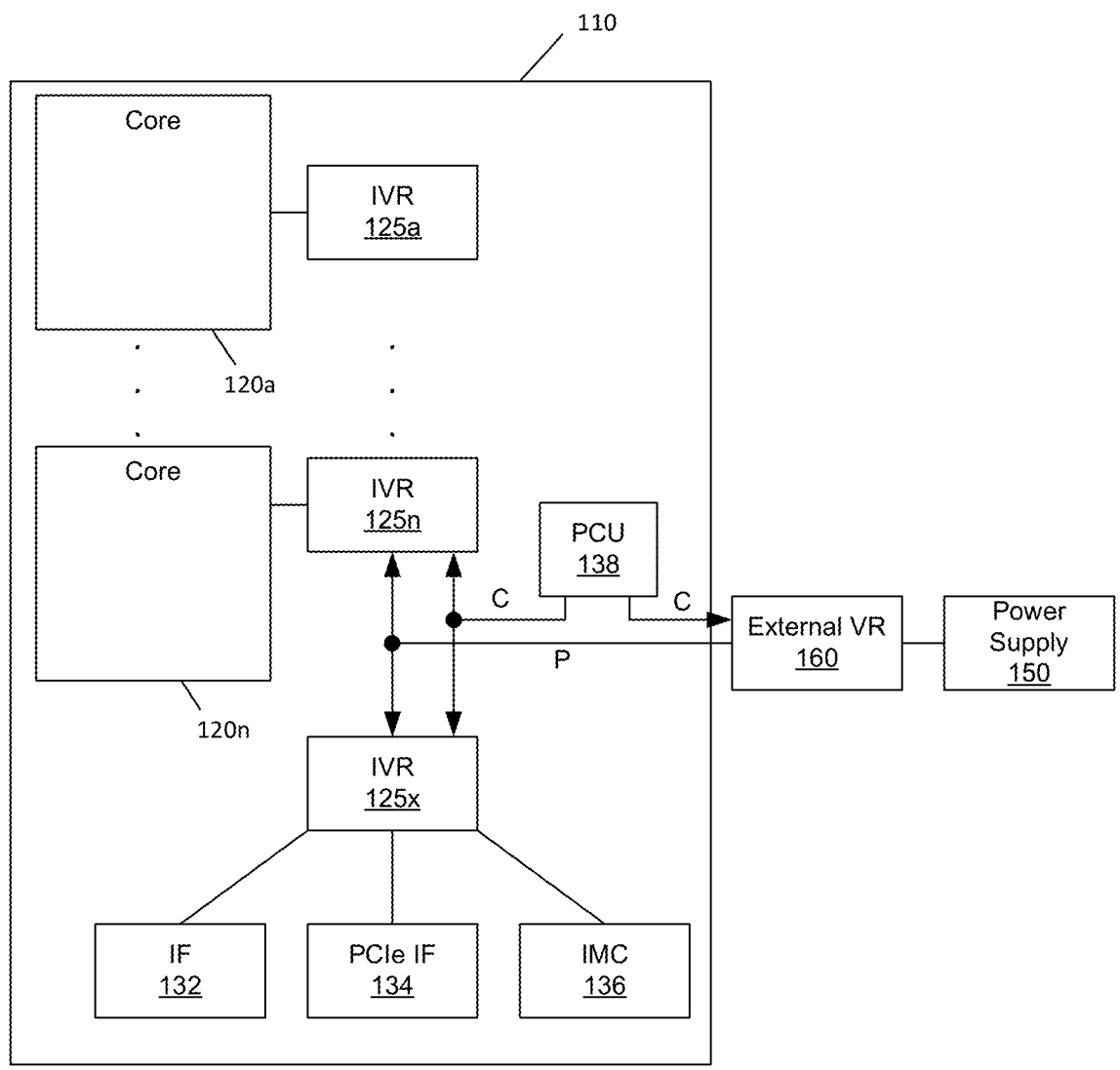
FIG. 1 is a block diagram of a portion of a system in accordance with an embodiment of the present invention.

In various embodiments, a processor may be provided with mailbox interface circuitry to enable interaction between a core and core perimeter circuitry coupled to the core. In this way, the communication of information (including context information) may occur during entry and exit flows into and out of certain low power states. By way of this mailbox interface, enhanced communications at lower latencies may be realized between the core and core perimeter circuitry, which may include one or more storages to enable storage of context information in a sustain power domain portion of the core perimeter circuitry while the core itself is in a particular low power state.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future, such as for power conservation and energy efficiency in products that encompass a large portion of the US economy.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an integrated voltage regulator (IVR) $125_a$-$125_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be enable operation for an Intel® Quick Path Interconnect (QPI) interconnect, which provides for point-to-point (PtP) links in a cache coherent protocol that includes multiple layers including a physical layer, a link layer and a protocol layer. In turn, interface 134 may communicate via a Peripheral Component Interconnect Express (PCIe™) protocol.

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or management power management source or system software).

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited.

Note that the power management techniques described herein may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle. Although described with these particular examples, understand that many other power management techniques may be used in particular embodiments.

Figure 2:
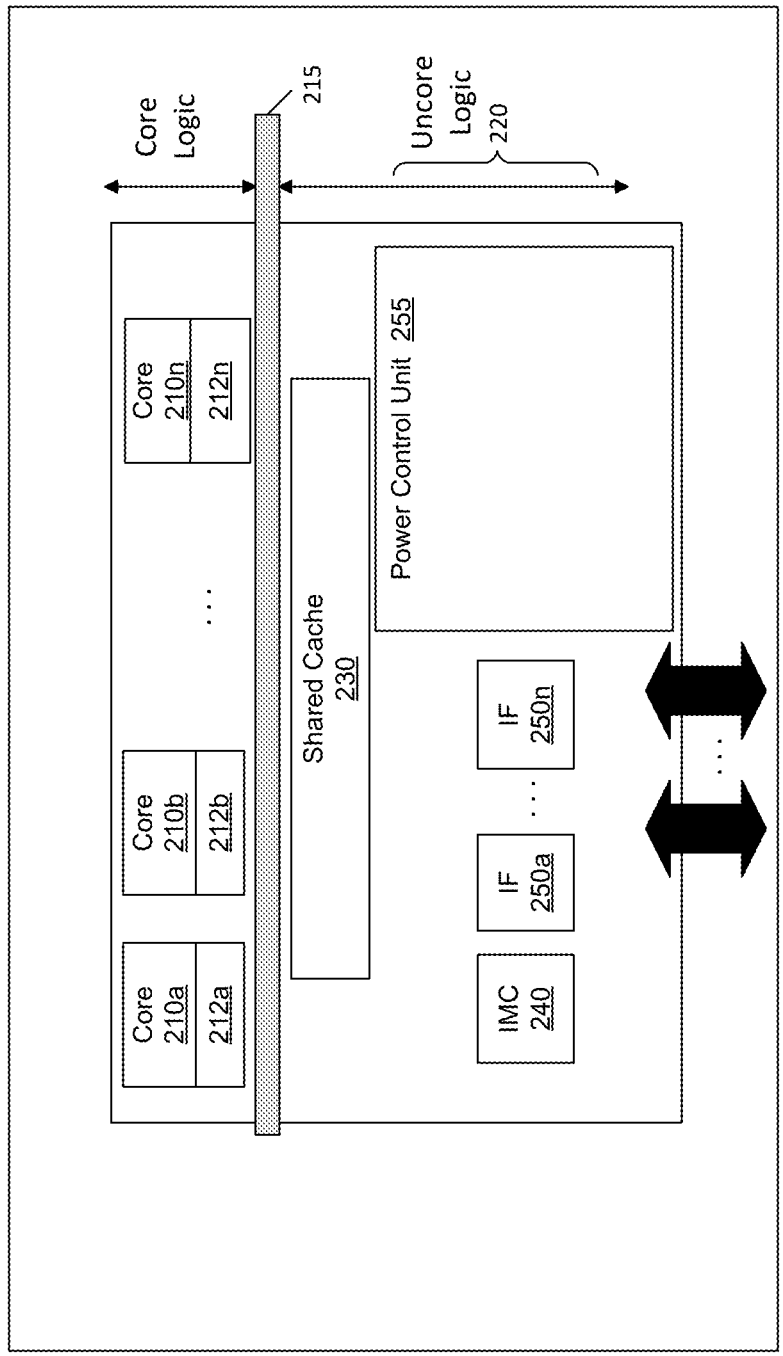
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores $210_a$-$210_n$. In one embodiment, each such core may be of an independent power domain and can be configured to enter and exit active states and/or maximum performance states based on workload. Each core 210 may be associated with a corresponding core perimeter logic 212a-212n. In general, core perimeter logic 212 may include one or more independent power/frequency domains that provide an interface between core circuitry and a remainder of the processor. Notably, one or more independent storage units of each core perimeter logic 212 may be adapted to store at least certain context information of the associated core to enable fast entry into and exit from particular low power states and to further enable certain processor operations (such as interrupt handling and snoop responses) to occur while a corresponding core is in a low power state. As further described herein, each core 210 may include mailbox interface circuitry to enable interfacing between the core and its associated core perimeter logic.

The various cores may be coupled via an interconnect 215 to a system agent or uncore 220 that includes various components. As seen, the uncore 220 may include a shared cache 230 which may be a last level cache. In addition, the uncore may include an integrated memory controller 240 to communicate with a system memory (not shown in FIG. 2), e.g., via a memory bus. Uncore 220 also includes various interfaces 250 and a power control unit 255, which may include logic to perform the power management techniques described herein. In some cases, in addition to direct connections between given cores 210 and uncore 220, core perimeter logics 212 also may be directly coupled to at least portions of uncore 220.

In addition, by interfaces 250a-250n, connection can be made to various off-chip components such as peripheral devices, mass storage and so forth. While shown with this particular implementation in the embodiment of FIG. 2, the scope of the present invention is not limited in this regard.

Figure 3:
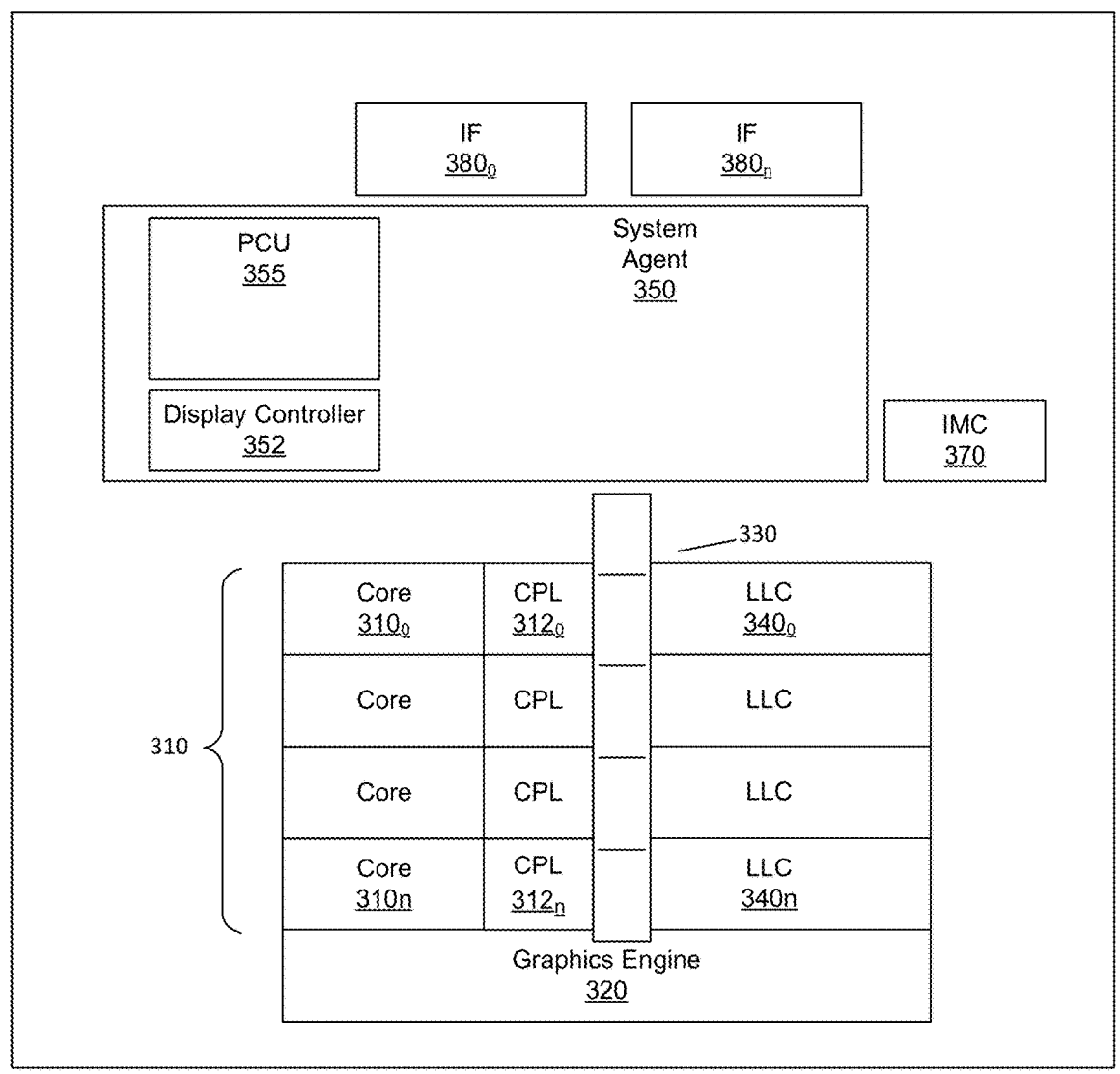
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores $310_0$-$310_n$, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) $340_0$-$340_n$. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect can be of its own domain. As further shown, a plurality of core perimeter logics $312_0$-$312_n$ each may be associated with a given core and may provide for efficient storage and retrieval of context information, e.g., as used during low power entry and exit situations. In the illustration of FIG. 3, core perimeter logic 312 is shown coupled between a corresponding core 310 and ring interconnect 330. However understand that direct connection between core 310 and ring interconnect 330 may be present, along with corresponding direct connection between core perimeter logic 312 and ring interconnect 330, in some embodiments.

As further seen, system agent domain 350 may include display controller 352 which may provide control of and an interface to an associated display. As further seen, system agent domain 350 may include a power control unit 355 which can include logic to perform the power management techniques described herein.

As further seen in FIG. 3, processor 300 can further include an integrated memory controller (IMC) 370 that can provide for an interface to a system memory, such as a dynamic random access memory (DRAM). Multiple interfaces $380_0$-$380_n$ may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more QPI interfaces may also be provided. Although shown at this high level in the embodiment of FIG. 3, understand the scope of the present invention is not limited in this regard.

Figure 4:
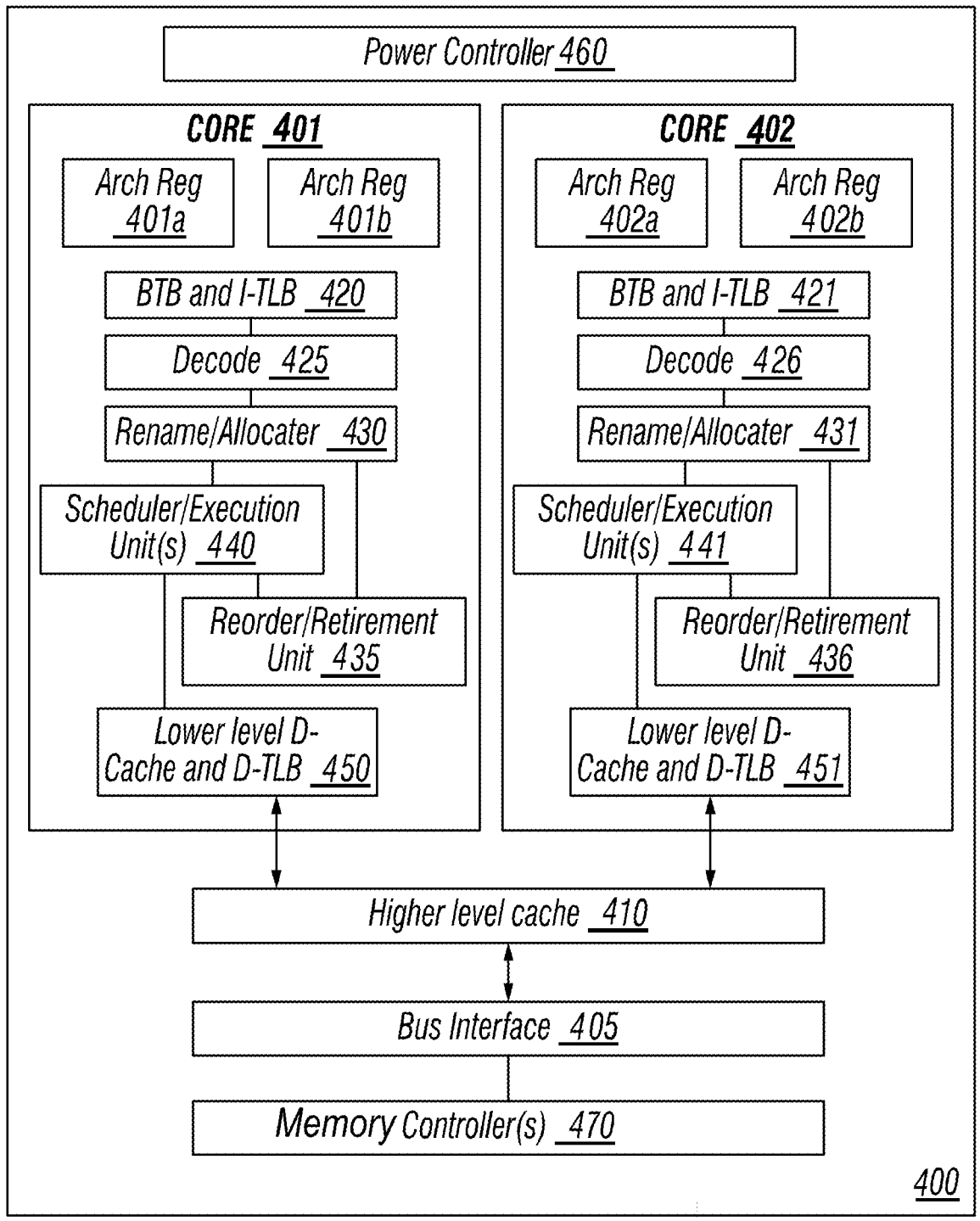
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401a and 401b, which may also be referred to as hardware thread slots 401a and 401b. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401a, a second thread is associated with architecture state registers 401b, a third thread may be associated with architecture state registers 402a, and a fourth thread may be associated with architecture state registers 402b. Here, each of the architecture state registers (401a, 401b, 402a, and 402b) may be referred to as processing elements, thread slots, or thread units, as described above. As illustrated, architecture state registers 401a are replicated in architecture state registers 401b, so individual architecture states/contexts are capable of being stored for logical processor 401a and logical processor 401b. In core 401, other smaller resources, such as instruction pointers and renaming logic in allocator and renamer block 430 may also be replicated for threads 401a and 401b. Some resources, such as re-order buffers in reorder/retirement unit 435, ILTB 420, load/store buffers, and queues may be shared through partitioning. Other resources, such as general purpose internal registers, page-table base register(s), low-level data-cache and data-TLB 415, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to fetch unit 420 to decode fetched elements. Fetch logic, in one embodiment, includes individual sequencers associated with thread slots 401a, 401b, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401a and 401b are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power controller 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
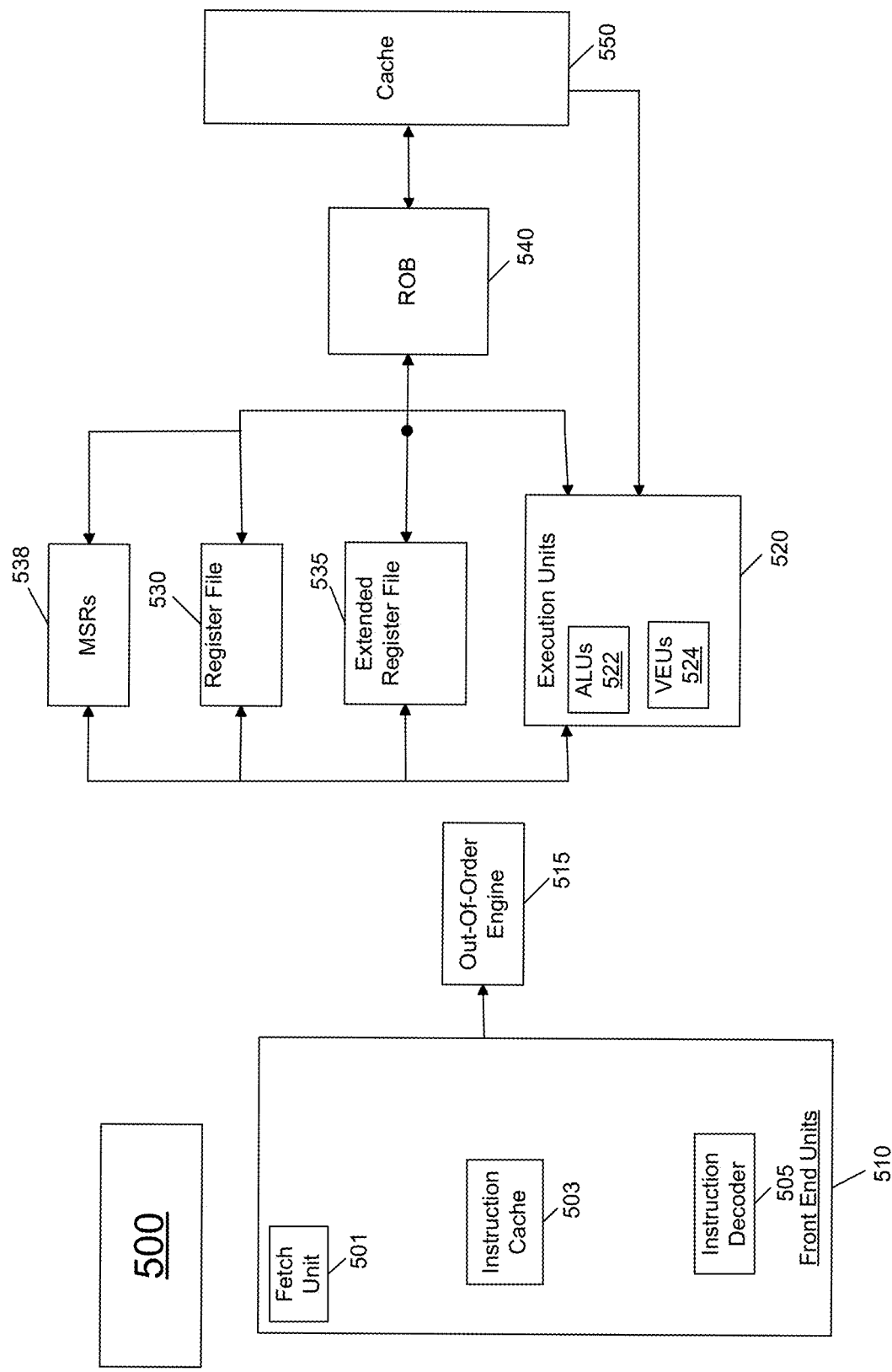
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. For purposes of configuration, control, and additional operations, a set of machine specific registers (MSRs) 538 may also be present and accessible to various logic within core 500 (and external to the core). For example, power limit information may be stored in one or more MSR and be dynamically updated as described herein.

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
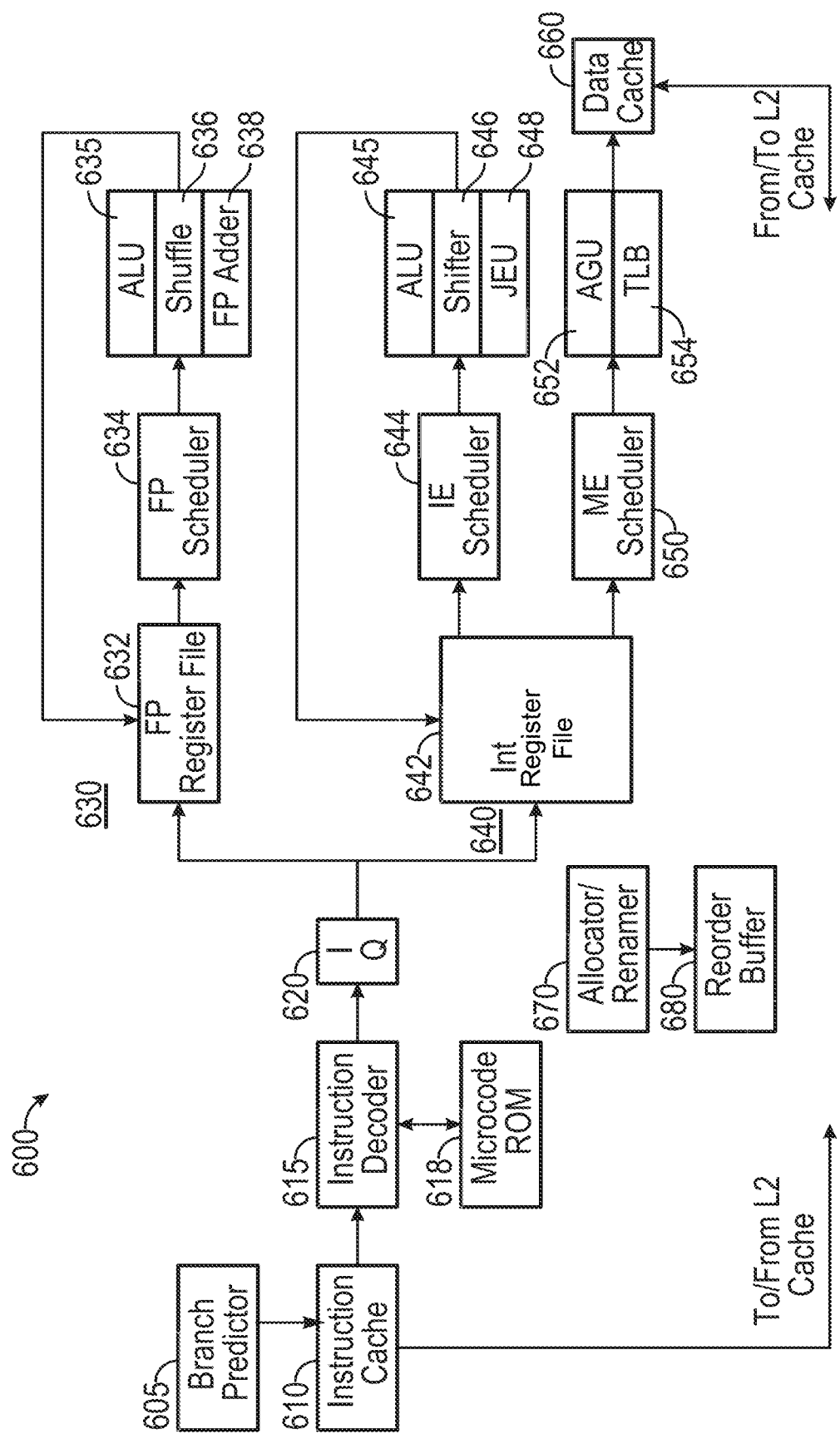
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel® Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue 620 for storage and delivery to a given execution pipeline. A microcode ROM 618 is coupled to instruction decoder 615.

A floating point pipeline 630 includes a floating point register file 632 which may include a plurality of architectural registers of a given bit with such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer register file 642 which may include a plurality of architectural registers of a given bit with such as 128 or 256 bits. Pipeline 640 includes an integer scheduler 644 to schedule instructions for execution on one of multiple execution units of the pipeline. In the embodiment shown, such execution units include an ALU 645, a shifter unit 646, and a jump execution unit 648. In turn, results generated in these execution units may be provided back to buffers and/or registers of register file 642. Of course understand while shown with these few example execution units, additional or different integer execution units may be present in another embodiment.

A memory execution scheduler 650 may schedule memory operations for execution in an address generation unit 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
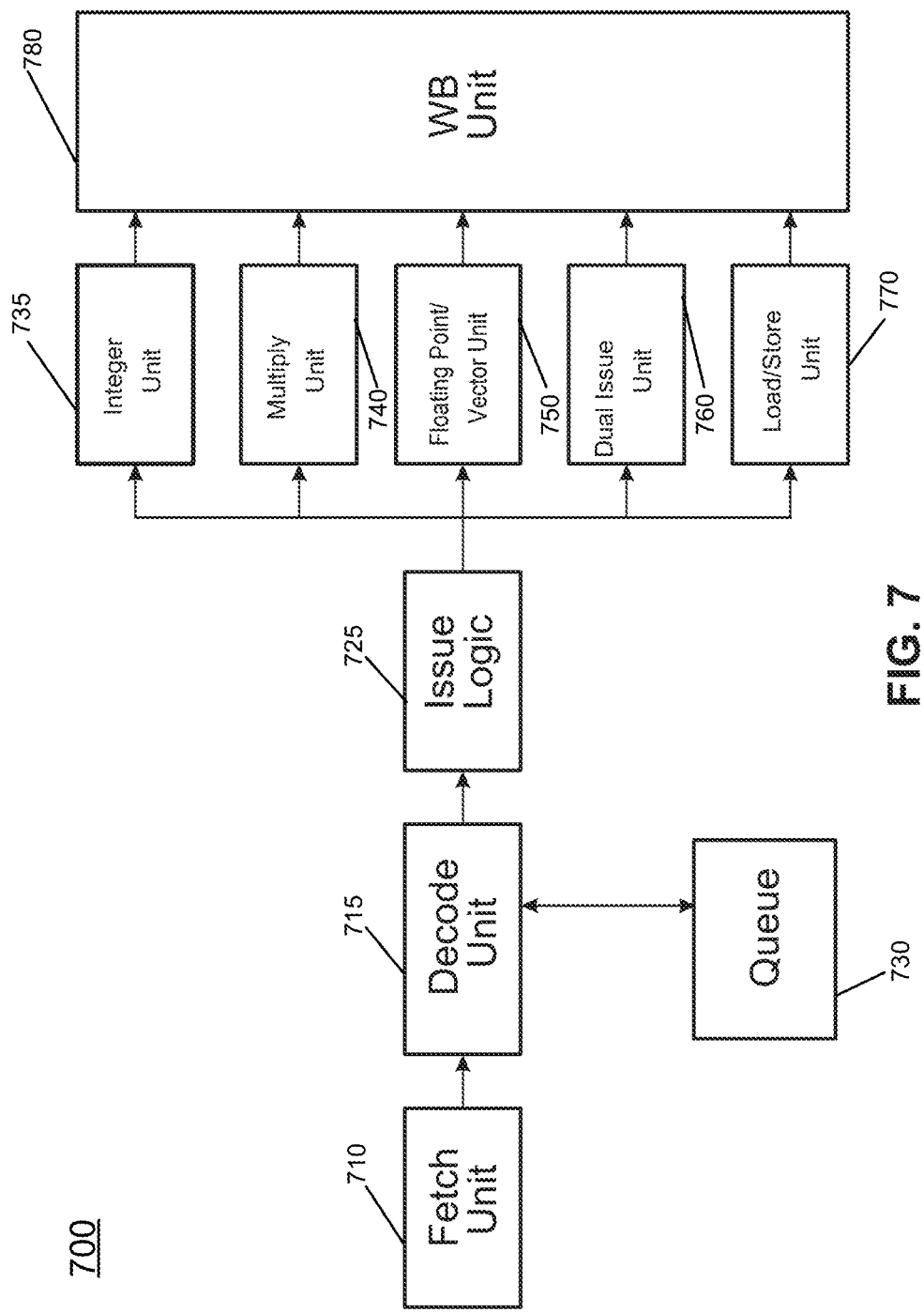
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 700 includes a fetch unit 710 that is configured to fetch instructions and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
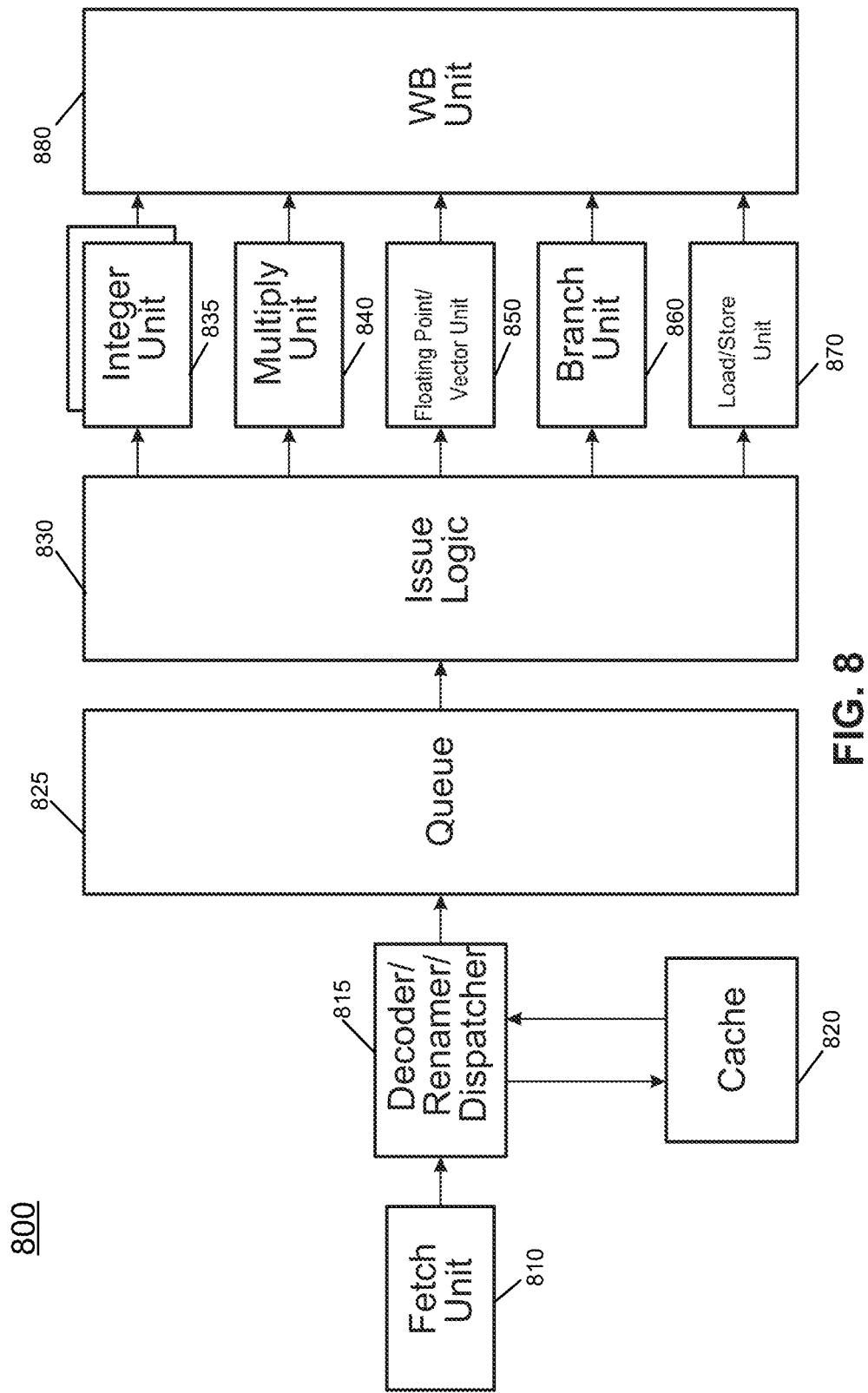
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions and provide them to a decoder/renamer/dispatcher 815, which may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
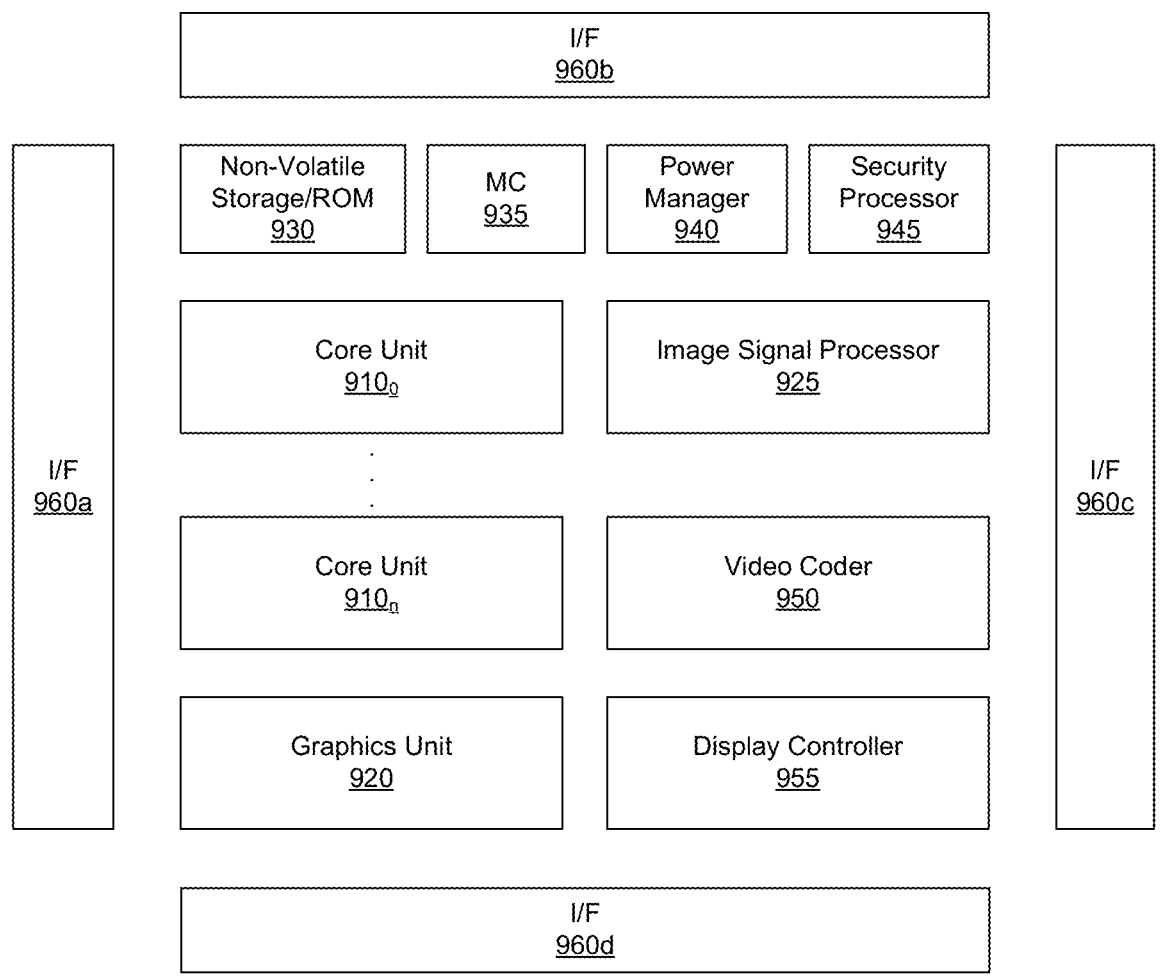
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device.

In the high level view shown in FIG. 9, processor 900 includes a plurality of core units 910$_0$-910$_n$. Each core unit may include one or more processor cores, one or more cache memories and other circuitry. Each core unit 910 may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. As also described herein, each core unit 910 may include a mailbox interface to enable interaction with a corresponding core perimeter logic (not specifically shown in FIG. 9), to enable enhanced communications and provide for efficient entry into and exit from low power states, among other functions. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform the various power management techniques described herein.

In some embodiments, SoC 900 may further include a non-coherent fabric coupled to the coherent fabric to which various peripheral devices may couple. One or more interfaces 960a-960d enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 9, understand the scope of the present invention is not limited in this regard.

Figure 10:
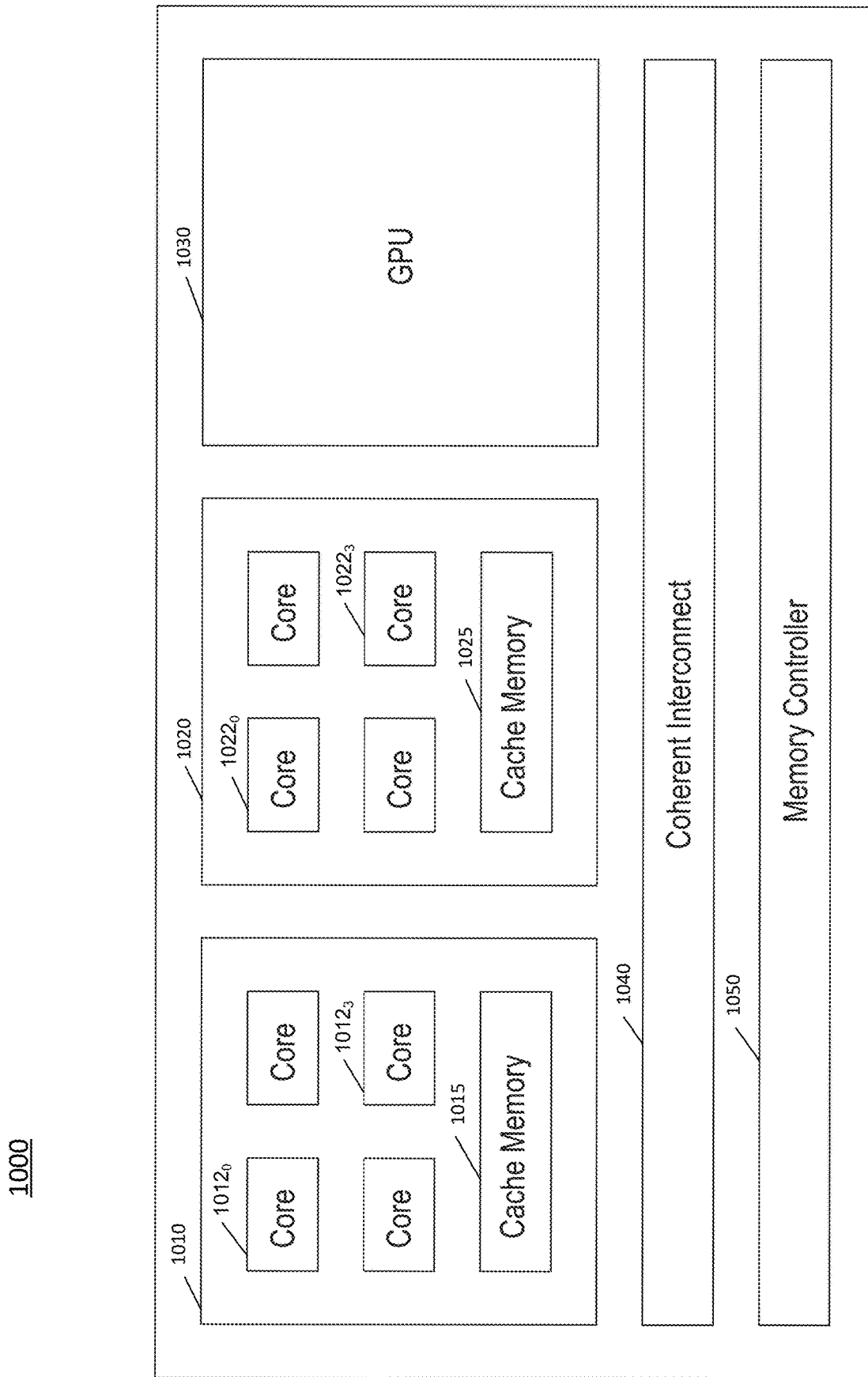
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 10, SoC 1000 includes a first core domain 1010 having a plurality of first cores $1012_0$-$1012_3$. In an example, these cores may be low power cores such as in-order cores that may interface with corresponding core perimeter logic via a mailbox interface as described herein. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores $1022_0$-$1022_3$. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
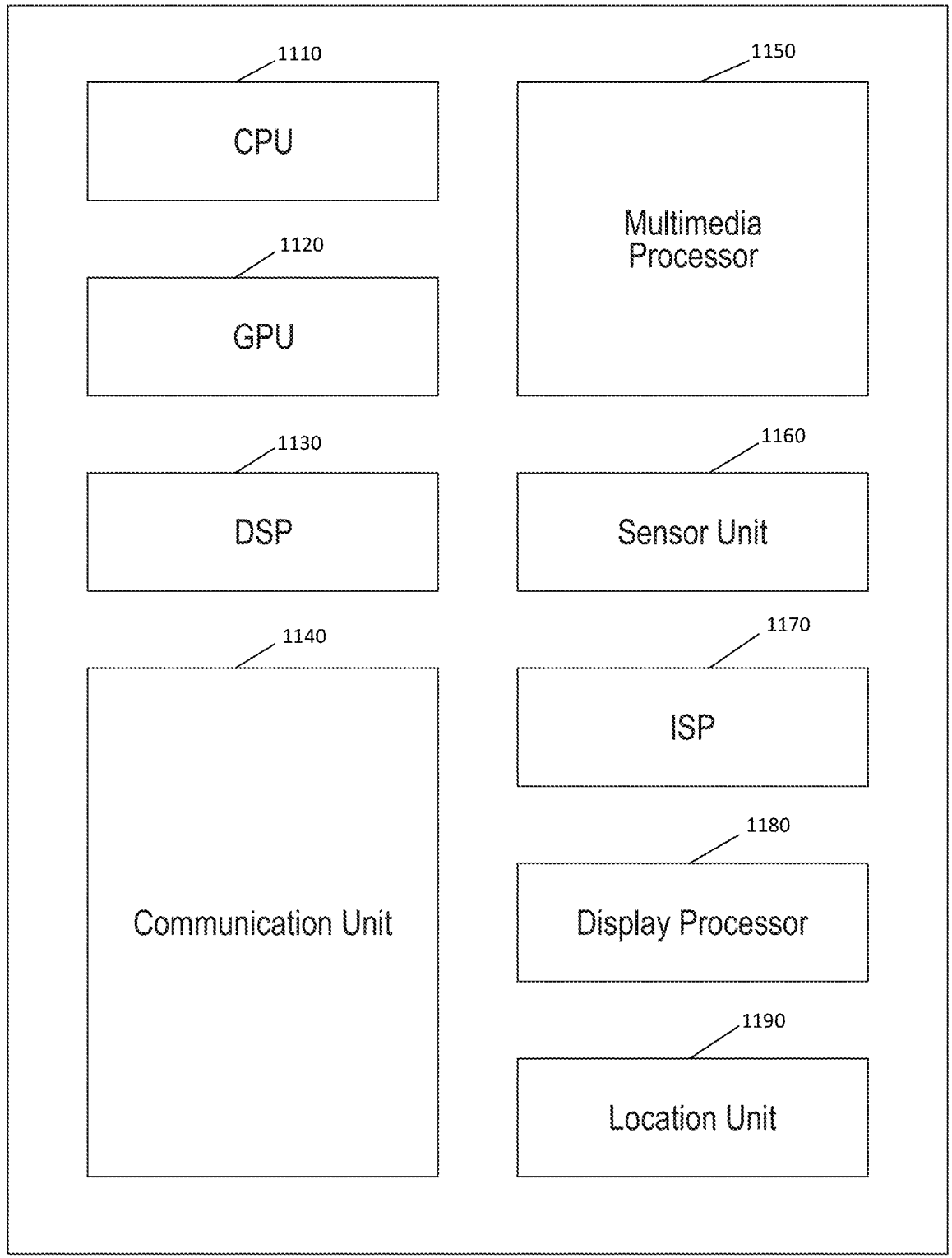
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area protocols such as Bluetooth™ IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
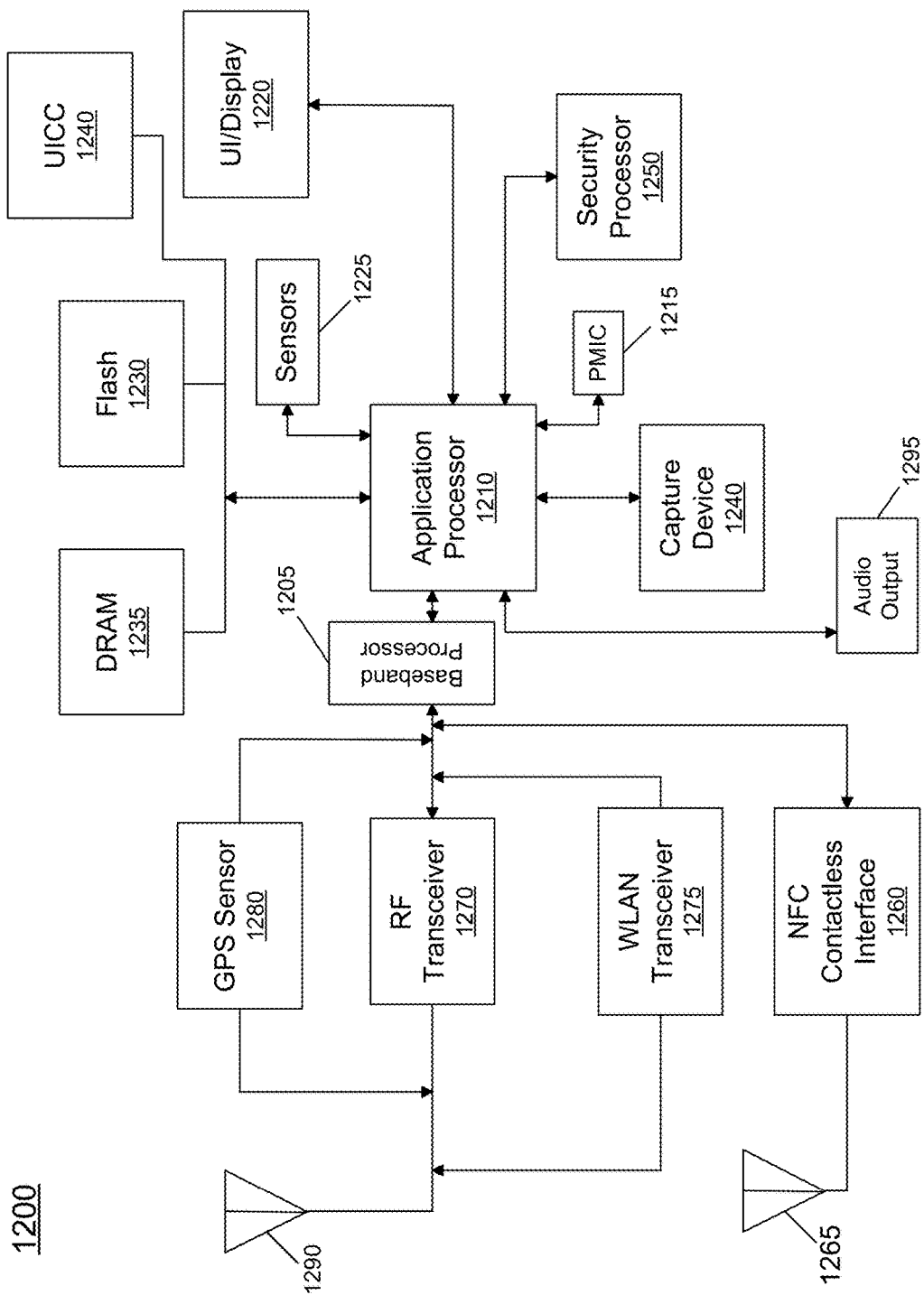
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module card and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications can also be realized.

Figure 13:
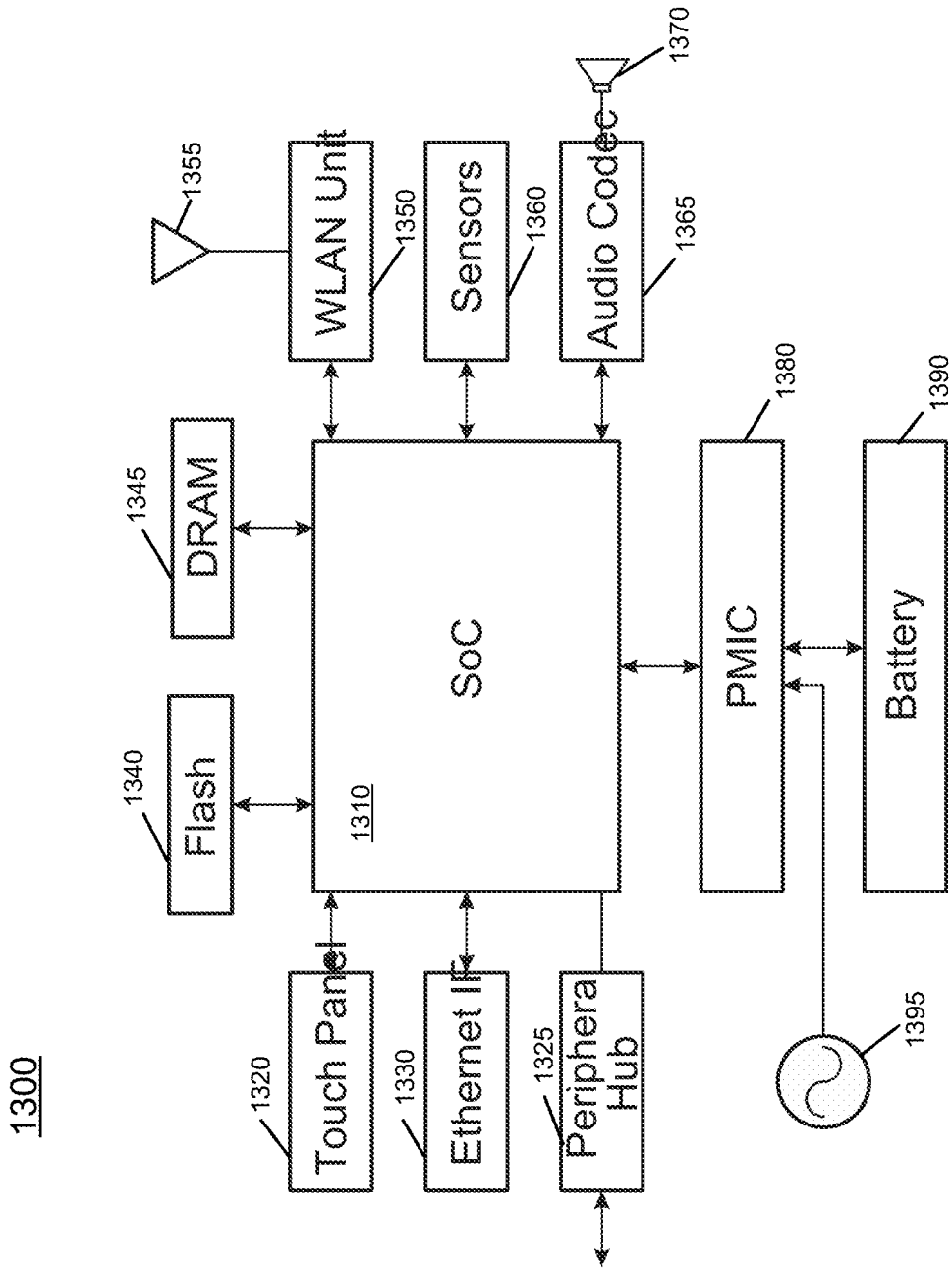
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
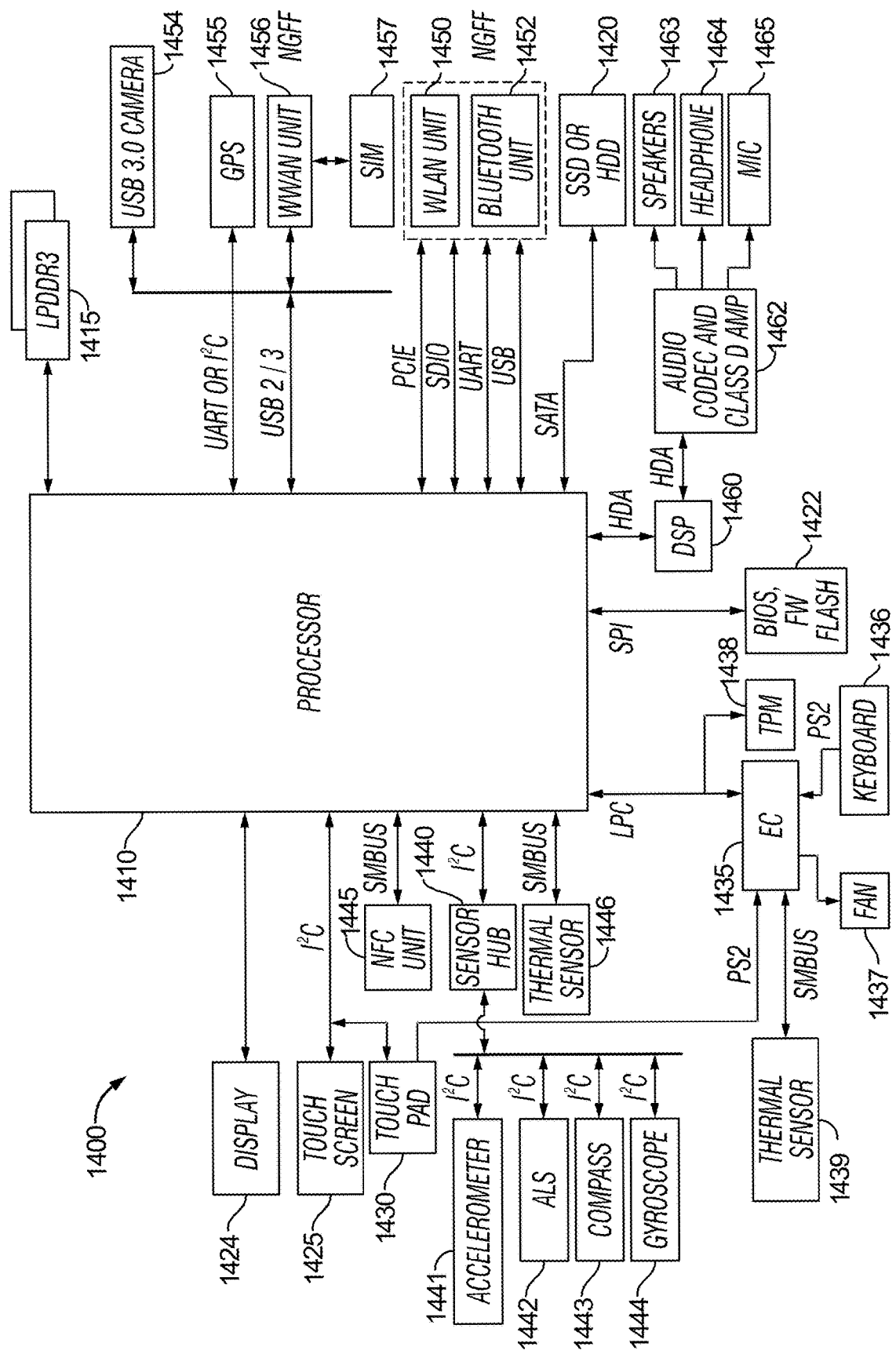
FIG. 14 is a block diagram of a representative computer system.

Referring now to FIG. 14, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I$^2$C interconnect. As further shown in FIG. 14, in addition to touch screen 1425, user input by way of touch can also occur via a touch pad 1430 which may be configured within the chassis and may also be coupled to the same I$^2$C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I$^2$C interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth unit 1452. Using WLAN unit 1450, Wi-Fi™ communications can be realized, while via Bluetooth unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given link.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
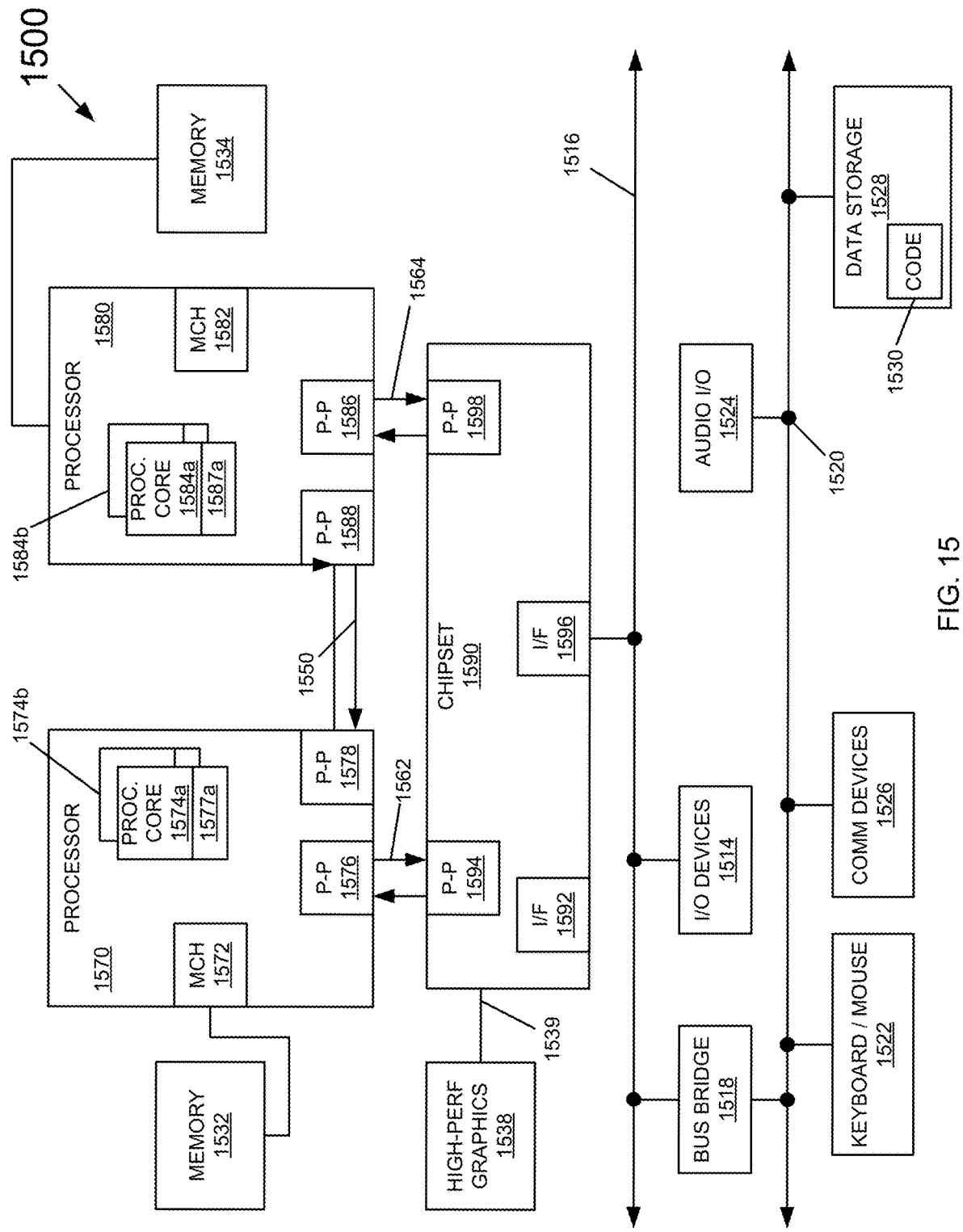
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processor cores 1574a and 1574b and processor cores 1584a and 1584b), although potentially many more cores may be present in the processors. Such processor cores may include a mailbox interface as described herein and may couple to corresponding core perimeter logics 1577a and 1577b and core perimeter logics 1587a and 1587b to enable efficient communication of context and other information, both for purposes of low power state entry and exit as well as for communication of information during normal operation. Each of the processors can include a PCU or other power management logic to perform processor-based power management as described herein.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chip set 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

Figure 16:
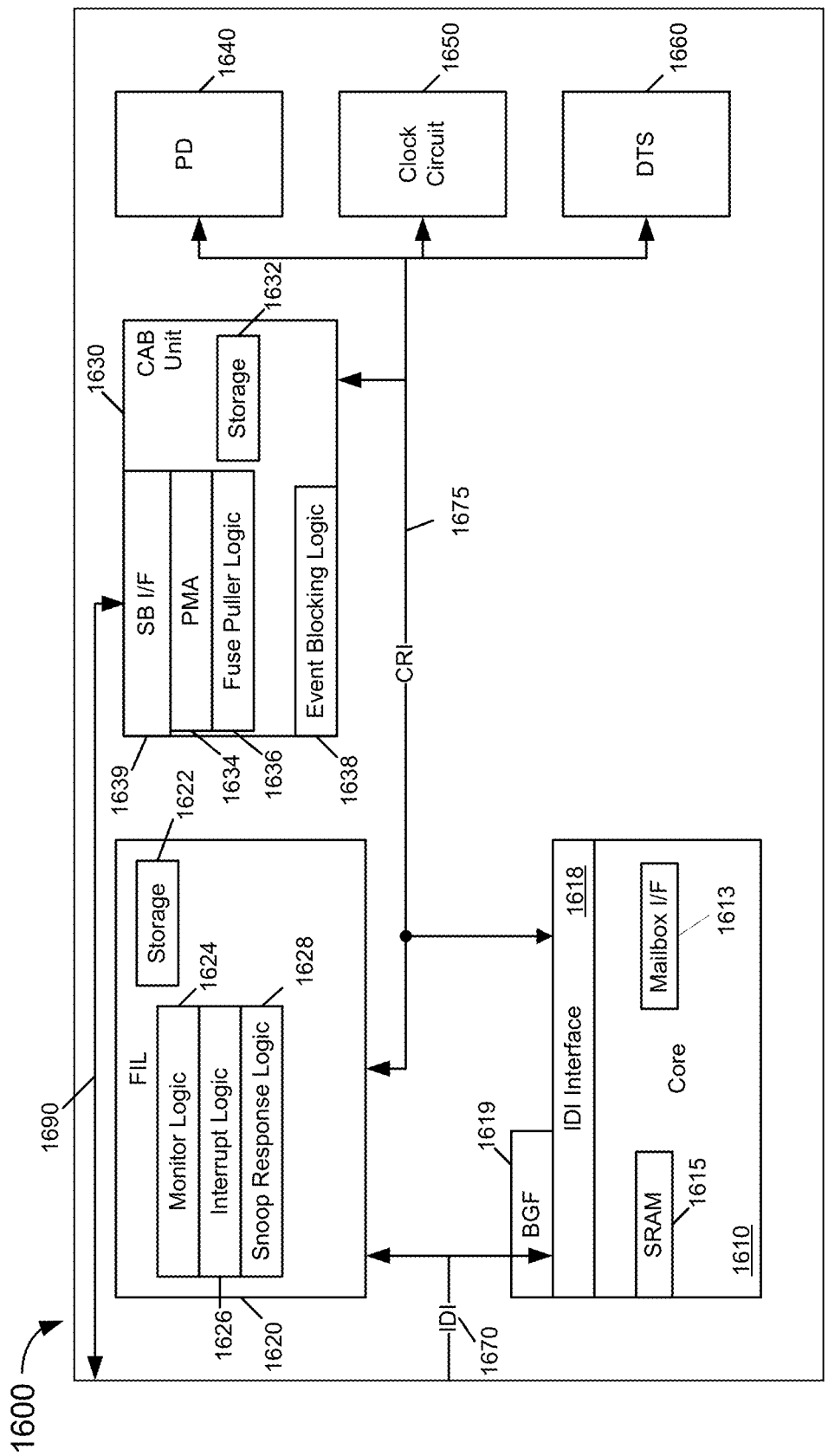
FIG. 16 is a block diagram of a processor in accordance with an embodiment of the present invention.

Referring now to FIG. 16, shown is a block diagram of a processor in accordance with an embodiment of the present invention. As shown in FIG. 16, processor 1600 includes a core 1610 and various core perimeter logic. Understand that for ease of illustration only a single core 1610 is shown. However, in many embodiments a multicore processor includes a plurality of cores, each with its own core perimeter logic. In the high level shown in FIG. 16, the components of processor 1600 all may be implemented on a single semiconductor die. As seen, core 1610 includes a storage 1615, which in an embodiment may be a static random access memory (SRAM) in which various context or state information of the core is stored. Note that the terms "state information" and "context information" are used interchangeably herein, and refer to information such as control register values, data information, register-stored information, and other information associated with a thread being executed on a core or other logic. Such information can be saved when the corresponding thread is switched from the core, e.g., due to entry into a low power state or migration to another core.

In an embodiment, storage 1615 may be configured to remain powered on while the core is in certain low power states. As an example, storage 1615 may maintain information while a core is in a given low power state (e.g., C6) and the processor package is in a package active state (C0). However, in other low power states, such power may not be available, and the context information may be sent to other storages as described herein. Core 1610 further includes an intra-die interconnect (IDI) interface 1618 to interface with an IDI 1670. Although not shown for ease of illustration, understand that IDI 1670 may couple core 1610 with various other circuitry within the processor (not shown for ease of illustration in FIG. 16), including one or more other cores, a peripheral controller hub (PCH), one or more cache memories and/or other uncore circuitry. To provide for an interface between core 1610 and other components within the processor that may operate at different frequencies, a clock crossing logic 1619 may be provided, which in an embodiment may be implemented as a bubble generator first in first out (FIFO) buffer. For efficient communications, core 1610 may include a mailbox interface 1613, described further herein.

To enable core 1610 to enter into particular and deeper low power states when available, a first core perimeter logic, namely a fabric interface logic (FIL) 1620, is coupled to core 1610. FIL 1620 may be of a first sustain power domain, in that it is provided with power and clock signals when at least portions of the processor are in a low power state. As seen, FIL 1620 couples to core 1610 via both IDI 1670 and a second interconnect 1675, which in an embodiment is a control register interconnect (CRi). Interconnect 1675 may be a relatively simple and low performance interconnect to provide for communication of state information during save and restore operations for low power state entry and exit.

In the embodiment shown in FIG. 16, FIL 1620 includes a storage 1622, which may be implemented as a plurality of registers configured to store the state information received from core 1610 prior to the core's entry into a given low power state, which may be received via a mailbox interface of core 1610. Power may be maintained to FIL 1620 until the processor package enters a deeper package low power state (e.g., a package C6 state) when a coherent fabric enters a low power state. As further shown, FIL 1620 includes a monitor logic 1624, an interrupt control logic 1626, and a snoop response logic 1628. In general, monitor logic 1624 may be configured, when core 1610 is in a low power state, to monitor one or more monitored locations for an update to a value stored therein. Upon such update, FIL 1620 may communicate a wakeup request to core 1610. In an embodiment, monitor logic 1624 may thus be configured to implement MONITOR/MWAIT operations while core 1610 is in a low power state. In turn, interrupt control logic 1626 may be configured to handle incoming interrupts while core 1610 is in a low power state. Such handling may include delaying the interrupt and/or sending a response to the interrupt. Still further, in some cases the handling may include causing core 1610 to wake up to handle the interrupt. Also, FIL 1620 includes a snoop response logic 1628, which may be configured to send a snoop response to a snoop request that is incoming while core 1610 is in a low power state. That is, because there is no corresponding cache line present for a snoop request when the core is in a low power state, snoop response logic 1628 thus may send a response to indicate that core 1610 does not include a copy of a cache line associated with the snoop request.

Still referring to FIG. 16, an additional core perimeter logic is a chassis adapter block (CAB) unit 1630. In general, CAB unit 1630 may be configured to provide an interface to other processor and system components via a sideband interconnect 1690. Still further, CAB unit 1630 may be configured to store state information of core 1610 when FIL 1620 itself is placed into a low power state. CAB unit 1630 may be of a second sustain power domain, in that it is provided with power and clock signals when other portions of processor 1600 (including FIL 1620) are in a low power state. CAB unit 1630 includes a storage 1632 that may be configured to store the state information obtained from FIL 1620. In an embodiment, storage 1632 of CAB unit 1630 may be a fast storage array, e.g., implemented as a SRAM.

In the embodiment shown, CAB unit 1630 includes a power management agent (PMA) 1634, a fuse puller logic 1636 that may include one or more finite state machines (FSMs) to perform save and restore operations, both with regard to storage 1622 and more distant portions of a memory hierarchy (e.g., a system memory) when CAB unit 1630 itself is to be placed into a low power state. For example, the information stored in storage 1622 may be flushed to system memory when the processor package enters a still deeper package low power state (e.g., a package C10 state). In an embodiment, these FSMs may be system on chip (SoC)-based FSMs as they enable interaction between core perimeter logic and other portions of an SoC (and onto further portions of a memory hierarchy). Note that PMA 1634 may be a portion of power management logic of a processor that may be active when CAB unit 1630 is powered on. In some cases, PMA 1634 may interface with a main power controller of a processor such as a PCU or other power management entity. CAB unit 1630 further includes an event blocking logic 1638, which may be configured to block incoming events when the processor is in particular low power states. Still further, CAB unit 1630 also includes a sideband interface 1639, which may interface with sideband interconnect 1690.

In an embodiment, storage 1632 of CAB unit 1630 may be allowed to be accessed by PMA 1634 or by a verified access received via sideband interface 1639. In one such embodiment, this interface may include a security attribute identifier (SAI) logic to determine whether an access request to storage 1632 has a valid SAI security protection (e.g., a SAI value received with the request matches a SAI value associated with the storage location to be accessed). As such, storage 1632 may be secured to store sensitive content.

In an embodiment, appropriate clocking logic may be applied to the various core perimeter logics to enable the storages and logic therein to be accessed in particular low power states. In an embodiment, double clocking logic may be applied to the storages of the sustain power domains. As one example, a cache coherent fabric (CCF) clock may be provided to the storages for standard read/write operations. In turn, a CRi clock may be provided to the storages for save/restore operations.

Understand that a processor may include additional components and circuitry. In the illustration of FIG. 16, processor 1600 further includes a power delivery unit 1640, which in an embodiment may include one or more fully integrated voltage regulators, a clock circuit 1650, which in an embodiment may be implemented as a phase lock loop, and a digital thermal sensor 1660. As seen, each of these components may communicate with the other components of processor 1600 via interconnect 1675. Understand while shown with this particular processor implementation in FIG. 16, many variations and alternatives are possible.

Figure 17:
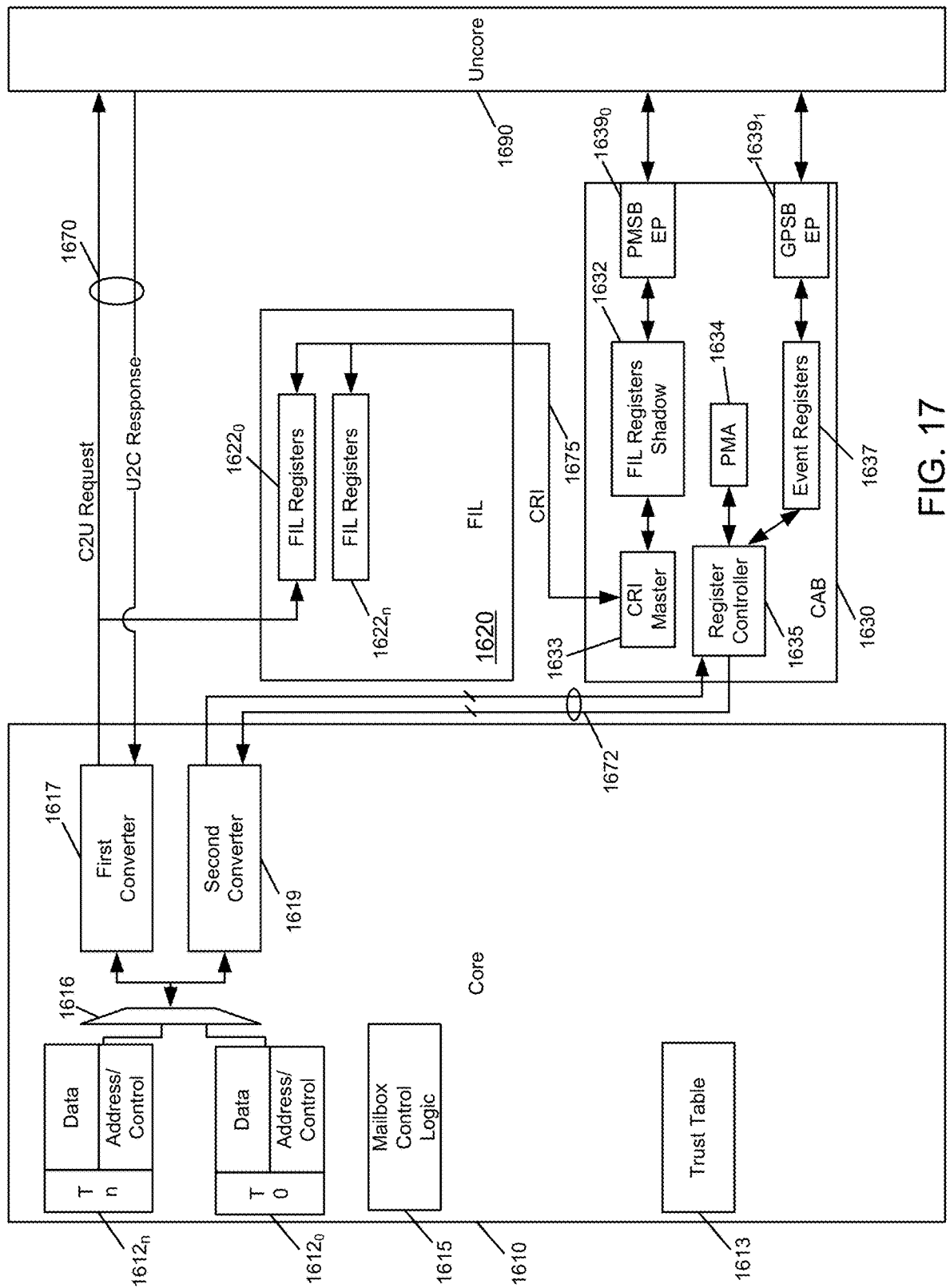
FIG. 17 is a block diagram of further details of a processor in accordance with an embodiment.

Referring now to FIG. 17, shown is a block diagram of further details of a processor in accordance with an embodiment. In the embodiment shown in FIG. 17, interaction between core 1610, FIL 1620, and CAB unit 1630 is further illustrated. More specifically, a mailbox interface provides an ability to read and write context information on low power state entry/exit. This interface also may be used in normal operation to communicate between different blocks in the core that are of different power/clock domains, for example, to set a monitor. As seen, core 1610 includes a plurality of mailbox storages $1612_0$-$1612_n$, each associated with a given thread. In the example shown, each of two threads has a mailbox storage that includes a data register and an address/control register. In an embodiment, each mailbox storage 1632 includes two 32-bit registers. Understand while shown with this particular implementation in FIG. 17, many variations and alternatives are possible, and a particular mailbox storage may take many different forms in different embodiments.

Core 1610 further includes a trust table 1613 to provide storage of trust information, to be used as described herein. In an embodiment, each mailbox storage 1612 may include a corresponding entry in trust table 1613, and in some cases an entry may be included for each register of each mailbox storage. As further illustrated in FIG. 17, core 1610 includes a mailbox control logic 1615. In various embodiments, control logic 1615 may be configured to perform various read and write operations with regard to mailbox storages 1612. In some embodiments, mailbox control logic 1615 may include or be associated with a microcode storage having microcode-encoded instructions stored thereon.

To enable an interface between mailbox storages 1612 and the portions of the core perimeter logic shown in FIG. 17, a selection logic 1616 (e.g., a multiplexer) may couple between mailbox storages 1612 and a first converter 1617 and a second converter 1619. In an embodiment, first converter 1617 provides a conversion between a mailbox format and an IDI format, while in turn second converter 1619 provides a conversion between the mailbox format and a parallel format in which information stored in the mailboxes is formatted into an appropriate form for delivery on the relevant interconnect. As such, first converter 1617 couples to various other components, including FIL 1620 and an uncore 1690 via IDI 1670. In turn, second converter 1619 couples to CAB unit 1630 via a dedicated parallel interconnect 1672, which in an embodiment may provide for a 40-bit parallel interface in each direction. Thus as shown in FIG. 17, the overall mailbox interface includes 3 independent domains, including a master domain in core 1610, a first slave domain in FIL 1620 (associated with a ring/mesh domain), and a second slave domain in CAB unit 1630 (associated with an infrastructure domain). In the embodiment shown IDI 1670 may be used to communicate with the ring/mesh domain via FIL 1620. In one embodiment, when microcode issues a write to a mailbox storage, an IDI request with a no-operation (NOP) command (e.g., a NOP opcode) is issued. In an embodiment, this NOP opcode may include an active prefetch indicator. Instead to communicate with the infrastructure domain via CAB unit 1630, a parallel interconnect 1672 may be used. When microcode writes to the mailbox interface for this domain, a request is sent on interconnect 1672. Microcode can request read and write access to the infrastructure domain, and read data supplied on interconnect 1672.

Rather than communicating through another interface such as a microcode-to-PCU mail box interface, the above-described mailbox interface provides for reduced latency. In an example, communication with the ring/mesh domain may have a latency of approximately 10 core cycles, and communication with the infrastructure domain may have a latency of approximately 100 core cycles.

With reference to FIL 1620, shown are a plurality of sets of FIL registers $1622_0$-$1622_n$. In an embodiment, each FIL register set may be associated with a particular hardware thread. Such registers may store context information for a given hardware thread when core 1610 is placed into a low power state. Similarly, when FIL 1620 itself is to be placed into a low power state, such context information may in turn be stored into CAB unit 1630, and more particularly into a shadow storage 1632 via CRI 1675.

With reference to CAB unit 1630, a CRI master logic 1633 acts as an interface between FIL 1620 and shadow storage 1632. In turn, for communications between core 1610 and CAB unit 1630, a register controller 1635 provides logic to interface between second converter 1619 and a PMA 1634 (which may include a set of registers). Still further, register controller 1635 couples to a set of event registers 1637, which may be used for machine check errors, design for (Dfx) modes and so forth. To provide an interface for storage of context information when CAB unit 1630 is to be placed into a low power state, a first sideband interface $1639_0$ provides interconnection to an uncore 1690. Via sideband interface $1639_1$, which is a power management sideband interface, PCU-PMA read-write access can occur. In turn, event information stored in event storage 1637 may be communicated to uncore 1690 via a second sideband interface $1639_1$. Note that for at least some deep low power states, uncore 1690 may in turn send the context information to a coupled memory (e.g., DRAM). Understand while shown at this high level in the embodiment of FIG. 17, many variations and alternatives are possible.

Figure 18:
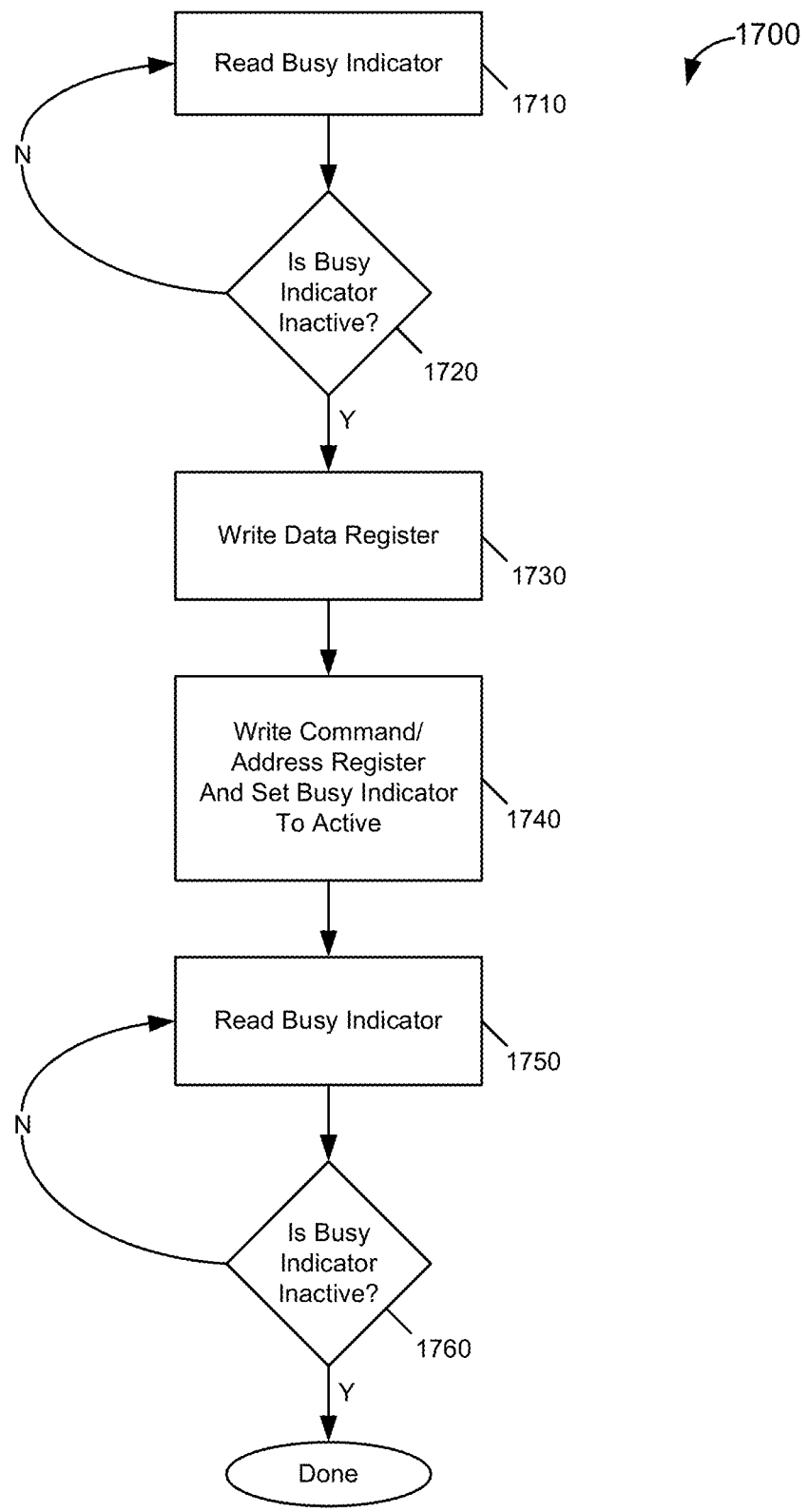
FIG. 18 is a flow diagram of a method for performing a write process to a core perimeter storage in accordance with an embodiment of the present invention.

Referring now to FIG. 18, shown is a flow diagram of a method for performing a write process to a core perimeter storage in accordance with an embodiment of the present invention. In an embodiment, method 1700 may be performed by microcode or other hardware-based logic to write information such as context information from a location within a core (e.g., a mailbox location) to a storage within a particular core perimeter logic.

As shown in FIG. 18, method 1700 begins by reading a busy indicator of a particular mailbox location (block 1710). This busy indicator acts as a polling bit to indicate when a transaction is completed. In various embodiments, no further access to a given register is allowed until a previous transaction has completed. Note that the mailbox location may be associated with a particular hardware thread for which information is to be stored to the core perimeter. Control next passes to diamond 1720 where it is determined whether the busy indicator indicates that the mailbox is not busy via an inactive busy indicator. If not busy, control passes to block 1730 where information may be written into a data register portion of the mailbox location. Thereafter at block 1740 command/address information may be written into a command/address portion of the mailbox location. Still further, the busy indicator may be set to an active state to indicate that the mailbox location is busy, and then hardware acts to write from the mailbox location to a destination in the FIL or PMA based on a destination indicator. Next control passes to block 1750, where the busy indicator is read, and at diamond 1760 it is determined whether the busy indicator indicates that the storage is not busy. Such indication means that no other entity is in the process of communicating with the mailbox interface, and that the write has been successfully sent to the destination by the hardware, and thus the method concludes. Otherwise if the busy indicator is still active, control passes back to block 1750.

Figure 19:
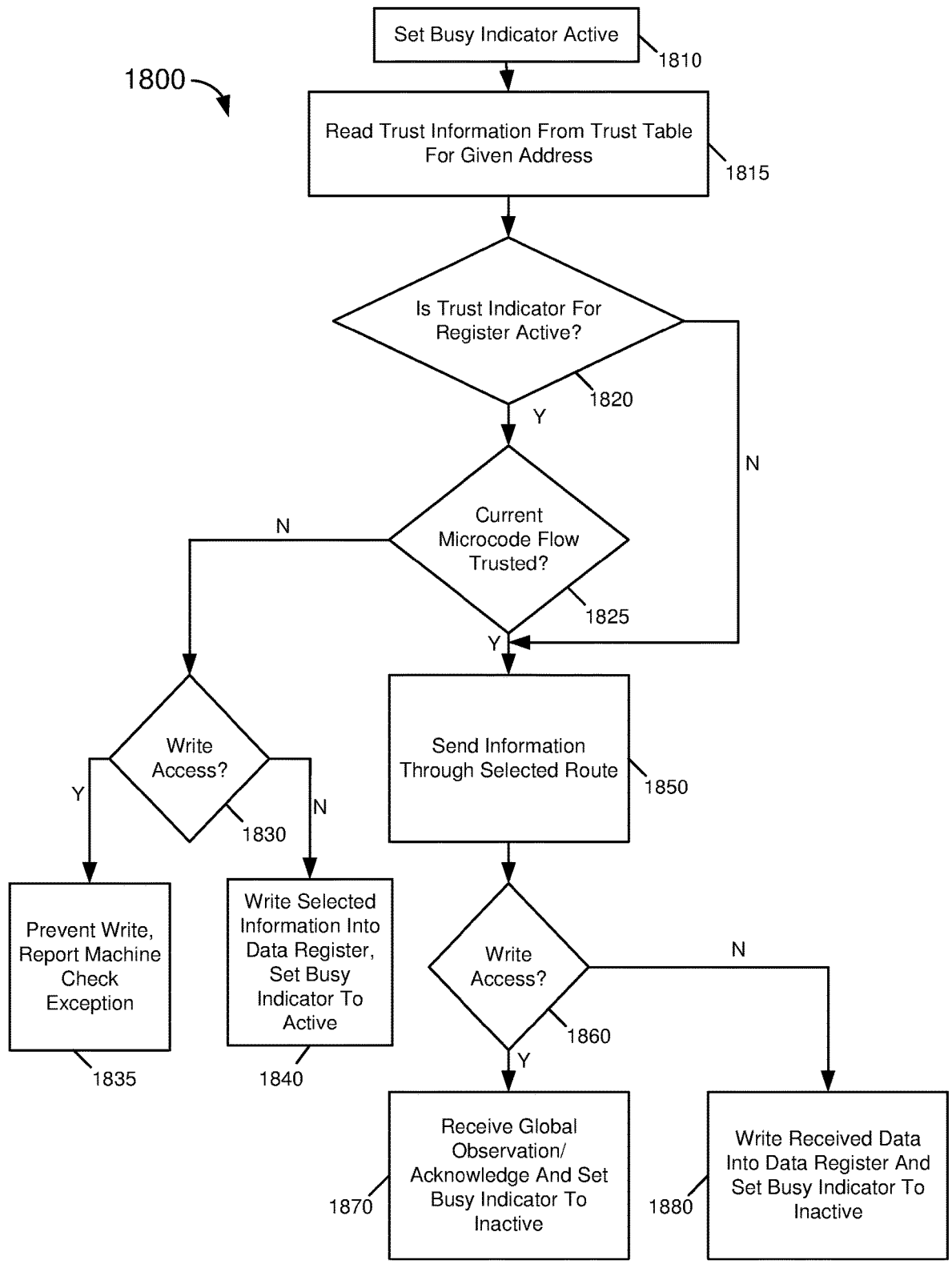
FIG. 19 is a flow diagram of a method for interacting with a mailbox storage in accordance with an embodiment.

Referring now to FIG. 19, shown is a flow diagram of a method for interacting with a mailbox storage in accordance with an embodiment. In an embodiment, method 1800 may be performed by hardware of a core, such as a mailbox control logic that interfaces with one or more mailbox locations. As seen, method 1800 begins by setting a busy indicator of a particular mailbox location to an active state (block 1810). Thereafter, trust information may be read from a trust table associated with the address of the mailbox location (block 1815).

Based on this access to the trust table, it is determined whether the trust indicator for this location is active (diamond 1820). If so, passes to diamond 1825 to determine whether the current microcode flow is trusted. If not, control passes to diamond 1830 to determine whether the requested access to the mailbox location is a write access. If so, control passes to block 1835 where such write access is prevented and a machine check exception is reported. Otherwise, if the access requested is not a write access, information may be written into the data portion of the mailbox location from the FIL/PMA and the busy indicator may be set to an active state at block 1840.

Still with reference to FIG. 19, control instead passes to block 1850 if the current microcode flow is trusted (or if a trust indicator for the indicated register is not set). At block 1850, information may be sent through the appropriate route, e.g., to a given perimeter location (such as a FIL or CAB unit). Next it is determined whether the access is a write access (diamond 1860). If so, when a global observation/acknowledgement is received from the uncore, the busy indicator may be set to an inactive state (block 1870). Otherwise, if the access is not a write access, control passes to block 1880, such that when the data arrives, it is written into the data register and the busy indicator is set to an inactive state. Understand that while shown at this high level in the embodiment of FIG. 19, many variations and alternatives are possible.

In an embodiment, microcode may write to registers in FIL 1630 but not read them. As such, a no-operation command may be used. In this scenario, when uncore 1690 receives such NOP command, it reports a global observation-invalid (GO-I), and the write operation is completed. This NOP command with a prefetch bit set may be treated by FIL 1620 as a register write command to write the corresponding information to a given FIL register 1622.

Referring now to Table 1, shown is an illustration of example fields of a command/address register of a mailbox storage in accordance with an embodiment. These different fields may be written by microcode and/or hardware and may be accessed by mailbox control logic to enable read and write operations both with regard to the mailbox storages as well as communication to core perimeter logics.

TABLE 1

| Field | Purpose |
| --- | --- |
| Busy | Indicates that hardware is actively in an access. Microcode is not allowed to change the value of the register. |
| TID | Final Thread ID |

TABLE 1-continued

| Field | Purpose |
| --- | --- |
| R/W# | If R/W# = 1, the register is to be rad, if R/W# = 0, the FIL register is to be written. |
| PMA/FIL# | If PMA/FIL# = 1, access CAB unit, if 0, access FIL |

In one embodiment, information of mailbox address/command and data registers may be communicated over particular bits of an address field. For example, data information of a data register of a given mailbox storage 1612 may be communicated over address bits[31:0] and command information of a command/address register of the mailbox storage, e.g., TID is sent over address bit[32], and the corresponding register address is sent over address bits[36:33]. Note in this embodiment, there is no need to send the trust indicator, as the trust check is done in mailbox control logic 1615 prior to sending the information. Further, there is no need to send a PMA/FIL# indication, as dedicated hardware (e.g., the two different converters) is used for each of those routes.

In an example, IDI request fields may be used to communicate data information from mailbox storages 1612 to corresponding FIL registers 1622. To realize this, uncore 1690 may be configured to ignore the information (not related to an IDI request) via the NOP command.

Via the mailbox interface, a variety of autonomous intellectual property (IP) logic blocks may communicate firmware with other domains inside and coupled to a given IP logic block. Embodiments may be used to reduce power management flow latencies, while at the same time simplifying communication between microcode and ring/mesh and infrastructure domains.

The following examples pertain to further embodiments.

In one example, a processor comprises: a core to execute instructions, the core including a plurality of mailbox storages and a trust table to store a trust indicator for each of the plurality of mailbox storages, each of the plurality of mailbox storages to be associated with a thread; a first core perimeter logic coupled to the core, the first core perimeter logic including a first storage to store state information of the core when the core is in a low power state; and a second core perimeter logic coupled to the first core perimeter logic and the core, the second core perimeter logic including a second storage to store the state information of the core when the first core perimeter logic is in a low power state.

In an example, each of the plurality of mailbox storages comprises: a data storage; and a command/address storage.

In an example, the core is to check a busy indicator of the command/address storage of a first mailbox storage and if the busy indicator is inactive, the core is to write data information to the data storage of the first mailbox storage and second information to the command/address storage of the first mailbox storage and activate the busy indicator.

In an example, the core is to write the data information and the second information responsive to a microcode write command.

In an example, the core is to access a trust indicator associated with the first mailbox storage and if the trust indicator is set, enable communication of the data information in the data storage of the first mailbox storage to one of the first core perimeter logic and the second core perimeter logic, if microcode that issued the microcode write command is trusted.

In an example, the core is to raise a machine check exception if the microcode is not trusted.

In an example, the microcode write command comprises an intra-die interconnect no operation command.

In an example, the core includes a first converter to convert information stored in a first mailbox storage to a format for communication on an intra-die interconnect coupled between the core and the first core perimeter logic.

In an example, the core includes a second converter to convert information stored in a second mailbox storage to a format for communication on a parallel interconnect coupled between the core and the second core perimeter logic.

Note that the above processor can be implemented using various means.

In an example, the processor comprises a SoC incorporated in a user equipment touch-enabled device.

In another example, a system comprises a display and a memory, and includes the processor of one or more of the above examples.

In another example, a method comprises: determining, via a mailbox control logic of a core of a processor, a state of a busy indicator of a first mailbox storage of the core; if the busy indicator state is inactive writing, via the mailbox control logic, data information and control information into the first mailbox storage and setting the busy indicator to an active state; and determining whether a trust indicator associated with the first mailbox storage is active, and if so, sending at least a portion of the data information and the control information to one of a first core perimeter logic coupled to the core or a second core perimeter logic coupled to the core based on a value of a destination indicator of the control information.

In an example, the method further comprises causing the core to enter into a low power state, while the selected first core perimeter logic or the second core perimeter logic is to remain powered on.

In an example, the method further comprises: sending at least the portion of the data information and the control information to the first core perimeter logic, if selected, via a first interconnect coupled between the core and the first core perimeter logic and sending at least the portion of the data information and the control information to the second core perimeter logic, if selected, via a second interconnect coupled between the core and the second core perimeter logic.

In an example, the method further comprises converting the data information and the control information from a first format to a second format and thereafter sending the converted data information and the converted control information to the first core perimeter logic.

In an example, the method further comprises sending a no operation command with the data information and the control information to the first core perimeter logic, where the first core perimeter logic is to store the data information and the control information in a storage of the first core perimeter logic responsive to the no operation command, and an uncore coupled to the first interconnect is to report a global observation to the core responsive to the no operation command.

In an example, the first core perimeter logic is to store the data information and the control information in the storage responsive to the no operation command including an active prefetch indicator.

In an example, the method further comprises: storing the data information from the storage of the first core perimeter logic to a second storage of the second core perimeter logic before entry of the first core perimeter logic into a low power state; and storing the data information to a memory coupled to the processor before entry of the second core perimeter logic into a low power state.

In an example, the method further comprises: restoring the data information from the memory to the second storage of the second core perimeter logic after the second core perimeter logic exits the low power state; and restoring the data information from the second storage of the second core perimeter logic to the storage of the first core perimeter logic after the first core perimeter logic exits the low power state.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system comprises: a processor having a core to execute instructions, the core including a mailbox interface having a plurality of mailbox storages and a trust table to store a trust indicator for each of the plurality of mailbox storages, each of the plurality of mailbox storages to be associated with a thread, a core perimeter logic coupled to the core and including a first domain having a first storage to store state information of the core when the core is in a low power state and a second domain having a second storage to store the state information of the core when the first domain is in a low power state, a first interconnect to communicate between the mailbox interface and the first domain, and a second interconnect to communicate between the mailbox interface and the second domain; and a DRAM coupled to the processor.

In an example, the core, if a busy indicator of a first mailbox storage is inactive, is to write information to the first mailbox storage and activate the busy indicator, responsive to a microcode write command.

In an example, the core is to determine whether a trust indicator associated with the first mailbox storage is active, and if so, send at least a portion of the information from the first mailbox storage to one of the first domain or the second domain, based on a value of a destination indicator of the information.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a power controller to control power consumption of the processor;
a core to execute instructions, the core including a plurality of mailbox storages and a trust table to store a trust indicator for each of the plurality of mailbox storages to indicate whether an entity to access the corresponding mailbox storage is to be a trusted entity, each of the plurality of mailbox storages to communicate information in connection with entry of the core into a low power state and exit of the core from the low power state;
a first core perimeter logic coupled to the core, the first core perimeter logic comprising:
a first storage to store state information of the core when the core is in the low power state; and
a second core perimeter logic coupled to the first core perimeter logic and the core, the second core perimeter comprising:
a second storage to store the state information of the core when the first core perimeter logic is in a low power state;
a power management agent to interface with the power controller; and
a fuse puller logic to perform save and restore operations.

2. The processor of claim 1, wherein the power management agent comprises a portion of the power controller.

3. The processor of claim 2, wherein the power management agent is coupled to the power controller via a sideband interconnect.

4. The processor of claim 1, wherein the power management agent is active when the second core perimeter logic is powered on.

5. The processor of claim 1, wherein the core comprises an autonomous intellectual property agent.

6. The processor of claim 1, further comprising:
a first interconnect to couple the core and the first core perimeter logic; and
a second interconnect to couple the core, the first core perimeter logic and the second core perimeter logic.

7. The processor of claim 1, wherein the second core perimeter logic further comprises an event blocking logic to block incoming events when the processor is in the low power state.

8. The processor of claim 1, further comprising a double clock logic coupled to the first storage, wherein the double clock logic is to provide a first clock signal to the first storage for a read or write operation and provide a second clock signal to the first storage for a save or restore operation.

9. The processor of claim 1, wherein each of the plurality of mailbox storages comprises:
a data storage; and
a command/address storage.

10. The processor of claim 9, wherein the core is to check a busy indicator of the command/address storage of a first mailbox storage and if the busy indicator is inactive, the core is to write data information to the data storage of the first mailbox storage and second information to the command/address storage of the first mailbox storage and activate the busy indicator.

11. The processor of claim 10, wherein the core is to write the data information and the second information responsive to a microcode write command.

12. The processor of claim 11, wherein the core is to access a trust indicator associated with the first mailbox storage and if the trust indicator is set, enable communication of the data information in the data storage of the first mailbox storage to one of the first core perimeter logic and the second core perimeter logic, if microcode that issued the microcode write command is the trusted entity.

13. The processor of claim 1, wherein the core includes:
a selection logic coupled to the plurality of mailbox storages;
a first converter coupled to the selection logic to convert information stored in a first mailbox storage to a format for communication on a first interconnect coupled between the core and the first core perimeter logic; and
a second converter coupled to the selection logic to convert information stored in a second mailbox storage to a format for communication on a second interconnect coupled between the core and the second core perimeter logic.

14. A non-transitory machine-readable medium having stored thereon data, which if used by at least one machine, causes the at least one machine to fabricate at least one integrated circuit to perform a method comprising:
determining, via a mailbox control logic of a core of a processor, a state of a busy indicator of a first mailbox storage of the core, the first mailbox storage to communicate information in connection with entry of the core into a low power state and exit of the core from the low power state;
if the busy indicator state is inactive writing, via the mailbox control logic, data information and control information into the first mailbox storage and setting the busy indicator to an active state;
determining whether a trust indicator associated with the first mailbox storage is active to indicate whether an entity to access the first mailbox storage is to be a trusted entity, and if so, sending at least a portion of the data information and the control information from the first mailbox storage to one of a fabric interface logic or a chassis adapter block coupled to the core, the chassis adapter block including a power management agent, based on a value of a destination indicator of the control information; and
communicating, via a sideband interconnect, from the power management agent to a power controller of the processor.

15. The non-transitory machine-readable medium of claim 14, wherein the method further comprises causing the core to enter into the low power state, while at least one of the fabric interface logic and the chassis adapter block is to remain powered on.

16. The non-transitory machine-readable medium of claim 14, wherein the method further comprises:
converting at least the portion of the data information and the control information from a first format to a second format in a first converter of the core and thereafter sending the converted data information and the converted control information to the fabric interface logic, if selected, via a first interconnect coupled between the core and the fabric interface logic; and
converting at least the portion of the data information and the control information from the first format to a third format in a second converter of the core and thereafter sending the converted data information and the converted control information to the chassis adapter block, if selected, via a second interconnect coupled between the core and the chassis adapter block.

17. The non-transitory machine-readable medium of claim 14, wherein the method further comprises:
storing the data information from the fabric interface logic to a storage of the chassis adapter block before entry of the fabric interface logic into a low power state; and
storing the data information from the storage of the chassis adapter block to a memory coupled to the processor before entry of the chassis adapter block into a low power state.

18. A system comprising:
a processor having a power controller to control power consumption of the processor, a core to execute instructions, the core including a plurality of mailbox storages and a trust table to store a trust indicator for each of the plurality of mailbox storages to indicate whether an entity to access the corresponding mailbox storage is to be a trusted entity, each of the plurality of mailbox storages to communicate information in connection with entry of the core into a low power state and exit of the core from the low power state, a fabric interface logic coupled to the core, the fabric interface logic comprising a first storage to store state information of the core when the core is in the low power state, a chassis adapter block coupled to the fabric interface logic and the core, the chassis adapter block comprising a second storage to store the state information of the core when the fabric interface logic is in a low power state, a power management agent to interface with the power controller, and a fuse puller logic to perform save and restore operations; and
a dynamic random access memory (DRAM) coupled to the processor.

19. The system of claim 18, wherein the core, if a busy indicator of a first mailbox storage is inactive, is to write information to the first mailbox storage and activate the busy indicator, responsive to a microcode write command.

20. The system of claim 19, wherein the core is to determine whether a trust indicator associated with the first mailbox storage is active, and if so, send at least a portion of the information from the first mailbox storage to one of the fabric interface logic or the chassis adapter block, based on a value of a destination indicator of the information.

* * * * *